(12) United States Patent
Zhang et al.

(10) Patent No.: US 10,985,990 B2
(45) Date of Patent: Apr. 20, 2021

(54) SOFTWARE DEFINED TOPOLOGY (SDT) FOR USER PLANE

(71) Applicants: Hang Zhang, Nepean (CA); Xu Li, Nepean (CA)

(72) Inventors: Hang Zhang, Nepean (CA); Xu Li, Nepean (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 105 days.

(21) Appl. No.: 15/254,572

(22) Filed: Sep. 1, 2016

(65) Prior Publication Data

US 2017/0078153 A1  Mar. 16, 2017

Related U.S. Application Data

(60) Provisional application No. 62/218,962, filed on Sep. 15, 2015.

(51) Int. Cl.
   *H04L 12/24* (2006.01)
   *H04L 29/08* (2006.01)

(52) U.S. Cl.
   CPC .......... *H04L 41/12* (2013.01); *H04L 41/5009* (2013.01); *H04L 67/10* (2013.01); *H04L 41/5006* (2013.01)

(58) Field of Classification Search
   CPC . H04L 41/12; H04L 41/5006; H04L 41/5009; H04L 67/12; H04L 67/16;
   (Continued)

(56) References Cited

U.S. PATENT DOCUMENTS

| 7,131,091 B1 * | 10/2006 | Ganesan | ............. G06F 17/5022 |
| | | | 716/108 |
| 8,976,708 B1 * | 3/2015 | Cohn | .................... H04L 41/145 |
| | | | 370/254 |

(Continued)

FOREIGN PATENT DOCUMENTS

| CN | 103716176 A | 4/2014 |
| CN | 104009871 | 8/2014 |

(Continued)

OTHER PUBLICATIONS

International Search Report dated Nov. 28, 2016 for International Patent Application No. PCT/CN2016/098872 filed on Sep. 13, 2016.

(Continued)

*Primary Examiner* — Jason D Recek
*Assistant Examiner* — Ranjan Pant

(57) ABSTRACT

A controller and a method for determining a logical topology of communications resources for providing a service offering. The controller comprises a function identifier, a graph generator and a mapper. The identifier is coupled to a service level description (SLD) associating the service with at least one service type and a library of network functions (NFs) and identifies at least one NF in the library for each service type. The generator is coupled to the SLD and a library of primitive service level graphs (SLGs) representing at least one data flow between directly-coupled resource entities and associates at least one primitive SLG to each identified NF. The mapper is coupled to the service level description and a map of network infrastructure elements and maps at least one resource entity of a primitive SLG onto an available network infrastructure element.

24 Claims, 17 Drawing Sheets

(58) Field of Classification Search
CPC . H04L 41/0813; H04L 47/14; H04L 41/0816; H04L 45/74; H04L 47/24; H04L 49/3045; H04L 69/22; H04L 29/12783; H04L 41/5003; H04L 47/125; H04L 47/2408; H04L 41/50; H04L 67/1008; H04L 67/1029; H04L 67/10; G06F 9/50; H04W 28/24; H04W 48/18; G06Q 30/0633; G06Q 10/0833
See application file for complete search history.

(56) References Cited

U.S. PATENT DOCUMENTS

| | | | | |
|---|---|---|---|---|
| 9,258,218 | B2* | 2/2016 | Hampel | H04L 12/6418 |
| 9,843,531 | B2* | 12/2017 | Perreira | G06F 9/4843 |
| 9,864,634 | B2* | 1/2018 | Kenkre | G06F 9/50 |
| 9,979,602 | B1* | 5/2018 | Chinnakannan | H04L 47/82 |
| 2002/0152319 | A1* | 10/2002 | Amin | H04L 67/322 |
| | | | | 709/232 |
| 2004/0054690 | A1* | 3/2004 | Hillerbrand | G06Q 10/06 |
| 2007/0033590 | A1* | 2/2007 | Masuouka | G06F 9/5038 |
| | | | | 718/100 |
| 2011/0004457 | A1* | 1/2011 | Haviv | G06F 8/61 |
| | | | | 703/21 |
| 2013/0058227 | A1* | 3/2013 | Lemieux | G06F 9/5077 |
| | | | | 370/252 |
| 2013/0097304 | A1* | 4/2013 | Asthana | H04L 41/5025 |
| | | | | 709/224 |
| 2013/0132536 | A1* | 5/2013 | Zhang | H04L 41/0823 |
| | | | | 709/221 |
| 2013/0185438 | A1* | 7/2013 | Lumezanu | H04L 41/0896 |
| | | | | 709/226 |
| 2013/0297729 | A1* | 11/2013 | Suni | G06F 21/629 |
| | | | | 709/217 |
| 2014/0059178 | A1* | 2/2014 | Dutta | H04L 41/0883 |
| | | | | 709/219 |
| 2014/0092726 | A1 | 4/2014 | Khan et al. | |
| 2014/0153572 | A1* | 6/2014 | Hampel | H04L 12/6418 |
| | | | | 370/392 |
| 2014/0241346 | A1* | 8/2014 | Cohn | H04L 45/56 |
| | | | | 370/389 |
| 2014/0301192 | A1* | 10/2014 | Lee | H04L 47/10 |
| | | | | 370/230 |
| 2014/0307556 | A1 | 10/2014 | Zhang | |
| 2014/0362730 | A1 | 12/2014 | Kai et al. | |
| 2015/0023174 | A1* | 1/2015 | Dasgupta | H04L 47/24 |
| | | | | 370/236 |
| 2015/0131484 | A1 | 5/2015 | Aldrin | |
| 2015/0200838 | A1 | 7/2015 | Nadeau et al. | |
| 2015/0295761 | A1* | 10/2015 | Wang | H04L 41/0806 |
| | | | | 709/222 |
| 2015/0295844 | A1* | 10/2015 | Perreira | G06F 9/4843 |
| | | | | 709/226 |
| 2016/0173370 | A1* | 6/2016 | Chiba | H04L 12/6418 |
| | | | | 370/390 |
| 2016/0188656 | A1* | 6/2016 | Ekanadham | G06F 16/2379 |
| | | | | 707/755 |
| 2016/0212017 | A1 | 7/2016 | Li et al. | |
| 2017/0012898 | A1* | 1/2017 | Zhu | H04L 41/12 |
| 2018/0024852 | A1* | 1/2018 | Yabushita | G06F 9/5077 |
| | | | | 718/1 |

FOREIGN PATENT DOCUMENTS

| | | |
|---|---|---|
| CN | 104219127 | 12/2014 |
| CN | 104780099 A | 7/2015 |
| WO | 2014197778 | 12/2014 |
| WO | 2015015785 | 2/2015 |
| WO | 201614159 | 1/2016 |
| WO | 2016118646 | 7/2016 |

OTHER PUBLICATIONS

English Translation of CN104009871.
English Translation of CN104219127.
Extended European Search Report dated Mar. 16, 2018 for corresponding European 16845700.0 filed Sep. 13, 2016.
Zhang et al., "5G Wireless Network: MyNET and SONAC", Jul. 1, 2015.
Network Functions Virtualisation (NFV); Management and Orchestration. Group Specification, European Telecommunications Standards Institute; Dec. 1, 2014.

* cited by examiner

| Service Type | Communication | Purpose / Application | NF Service Description 111 | | | | | NF QoS / QoE Description 112 |
|---|---|---|---|---|---|---|---|---|
| | | | Device Attributes | Distribution | Density | Communication Distance | Traffic Attributes | |
| A | Info collection | Internet access Chat (data) | Fixed Limited battery | Large area | H / M / L | Remote | Short data burst | Reliability X |
| B | MTC | | Fixed Limited battery | Large area | H / M / L | Remote | Short data burst | Reliability Y |
| C | Slice (per-mobile) | | Mobile Limited battery | Single device | | Remote | Mixed | Rate P Latency C |
| D | MBB with single GW server | | Mobile Limited battery | Large area | H / M / L | Remote | Mixed | Rate Q Latency D |
| E | MBB with multiple GW servers | | Mobile Limited battery | Large area | H / M / L | Remote | Mixed | Rate R Latency E |
| F | Car traffic control | | Mobile | Large area | H / M / L | Local | Short data burst | Latency F |
| G | Private social / conference | | Mobile | Large area | / M / L | Remote | Mixed | Rate S Latency G |

FIG. 2

| Service Type | Commu-nication | Purpose / Application | NF Service Description 111 | | | | | NF QoS / QoE Description 112 | Network Processing | NF(s) 151 |
|---|---|---|---|---|---|---|---|---|---|---|
| | | | Device Attributes | Distri-bution | Density | Commu-nication Distance | Traffic Attributes | | | |
| A | Info collection | Internet access Chat (data) | Fixed Limited battery | Large area | H / M / L | Remote | Short data burst | Reliability X | Simple routing | UL: PA DL: PD |
| B | MTC | | Fixed Limited battery | Large area | H / M / L | Remote | Short data burst | Reliability Y | Load balancing | UL: PA DL: PD |
| C | Slice (per-mobile) | | Mobile Limited battery | Single device | | Remote | Mixed | Rate P Latency C | | AP (UE-specific) |
| D | MBB with single GW server | | Mobile Limited battery | Large area | H / M / L | Remote | Mixed | Rate Q Latency D | | AP VS |
| E | MBB with multiple GW servers | | Mobile Limited battery | Large area | H / M / L | Remote | Mixed | Rate R Latency E | | AP VS |
| F | Car traffic control | | Mobile | Large area | H / M / L | Local | Short data burst | Latency F | | PtMP |
| G | Private social / conference | | Mobile | Large area | / M / L | Remote | Mixed | Rate S Latency G | | AP VS |

FIG. 3

| Service Type | Commu-nication Purpose / Application | SLG Service Description 121 | | | | | SLG QoS / QoE Description 122 | Network Processing | NF(s) 151 | Primitive SLG(s) 410-480 | Network Graph Description 124 | |
|---|---|---|---|---|---|---|---|---|---|---|---|---|
| | | Device Attributes | Distri-bution | Density | Commu-nication Distance | Traffic Attributes | | | | | | |
| A | Info collection Internet access Chat (data) | Fixed Limited battery | Large area | H / M / L | Remote | Short data burst | Reliability X | Simple routing | UL: PA DL: PD | Star | UL: (PA)-B(K,L, by algorithm) DL: (PD) – C(K,L, by algorithm) | 201 |
| B | MTC | Fixed Limited battery | Large area | H / M / L | Remote | Short data burst | Reliability Y | Load balancing | UL: PA DL: PD | Star | UL: (PA)-D(K,L, by algorithm) DL: (PD) – D(K,L, by algorithm) | 202 |
| C | Slice (per-mobile) | Mobile Limited battery | Single device | | Remote | Mixed | Rate P Latency C | | AP (UE-specific) | Line | (A)–A(1,1) | 203 |
| D | MBB with single GW server | Mobile Limited battery | Large area | H / M / L | Remote | Mixed | Rate Q Latency D | | AP VS | Star (single server) | (AP)-A (1,1) (VS)-B(K,L, by algorithm Arbitrary order | 204 |
| E | MBB with multiple GW servers | Mobile Limited battery | Large area | H / M / L | Remote | Mixed | Rate R Latency E | | AP VS | Partial mesh (multiple server) | (AP)-A (1,1) (VS)-D(K,L, by algorithm Arbitrary order | 205 |
| F | Car traffic control | Mobile | Large area | H / M / L | Local | Short data burst | Latency F | | PtMP | PtMP broadcast | (PtMP)-C(K,L, by algorithm) | 206 |
| G | Private social / conference | Mobile | Large area | / M / L | Remote | Mixed | Rate S Latency G | | AP VS | Mesh (broadcast) | (AP)-A(1,1) (VS)-D(K,L, by algorithm Arbitrary order | 207 |

| Service level description 1200 | | | | | | Network attributes | 1240 |
|---|---|---|---|---|---|---|---|
| Service level graph 1220 | Device attribute | Communication attribute | Traffic source attributes | Density of devices | Device distribution | | User plane network functions |
| Star (N) | | Remote | - Small datagram<br>- Bursty | High | Large area | | Packet aggregation (PA) (concatenate packets from multiple sources) |
| | Mobile | | | | | | Anchor point (AP) (hold DL or UL data) |
| Mesh (N) | | | | | | | Virtual switch (VS) (data forwarding) |
| PtMP (N) | | | | | | | PtMP switch Broadcast/unicast ( car-to-car with network assistance – limited area) |
| NA | devices, Multi-interface capable | Remote | Stream/mixed | | | Multi-RAN | Convergence (multiple AL interfaces) |
| NA | Multi-AI | Remote | NA | | | Multi-RAT | Key material holder (network access protection) |
| | Single transport protocol | | | | | Multiple transport protocol | Protocol translation (transport rotocols) |
| | | | | | | | LB |
| | | | | | | | DPI |
| | | | | | | | FW |
| 1310 | 1320 | 1330 | 1340 | 1350 | 1360 | 1370 | 1380 |

FIG. 13

| 1400 | Service level description | | | | | Service QoE/QoS | | GW to internet/ servers | Network process requirement | Network graph (for segment graph description -> function name -> basic graph (A/B/C/D) (K,L) |
|---|---|---|---|---|---|---|---|---|---|---|
| Service level topology | Device | Traffic source attributes | Density of devices | Device distribution | | Rate per device | Latency | Numbers | | |
| Star (N) | | - Small datagram<br>- Bursty | High | Large area (KM2) | | | Low | NA | Simple routing | PA - B(K,L, by algorithm) |
| Star (N) | | - Small datagram<br>- Bursty | High | Large area (KM2) | | | Low | NA | Dynamic LB<br>Flexible routing | PA - D (K, L, by algorithm) |
| Line | Mobile | | | | | | | | | AP- A (0,0) |
| Partial mesh (N) | | | | | | | | Multiple | Dynamic LB<br>Flexible routing | VS – D (K, L, by algorithm) |
| Mesh (N) | | | | | | | | 1 | Simple routing | VS – B (K, L, by algorithm) |
| PtMP (broadcast) | | | | | | | | | | PtMP – C (K, L, by algorithm) |
| Mesh (N) | Mobile | | | | | | | 1 | Dynamic LB | AP- A (0,0) + VS - B (by algorithm) |
| Mesh (N) | Mobile | | | | | | | Multiple | Simple routing | AP- A (0,0) + VS - D (by algorithm) |
| 1410 | 1420 | 1430 | 1440 | 1450 | | 1460 | 1470 | 1480 | 1485 | 1490 |

FIG. 14

SOFTWARE DEFINED TOPOLOGY (SDT) FOR USER PLANE

CROSS REFERENCE TO RELATED APPLICATIONS

This application claims the benefit of priority to U.S. Patent Application Ser. No. 62/218,962 filed 15 Sep. 2015, the contents of which are incorporated herein by reference.

TECHNICAL FIELD

The present disclosure relates to wireless access networks and in particular to a method of and apparatus for virtualizing a network topology to dynamically build network function capability to provide a service for a service provider.

BACKGROUND

The demand for wireless resources in terms of bandwidth and throughput is ever increasing. One approach under consideration to meet this increasing demand is through virtualization of networks, in which pooled network resources are used to create a series of network slices, on each of which, one or more existing network nodes is instantiated with those network functions that provide a dynamic service level capability for a particular service. The use of network slices means that only those network functions that are appropriate are instantiated, and only as and when appropriate.

In some examples, each slice is used to provide an isolated service to a class of devices. The network operator can provide a service provider with a slice, or series of slices, that can be used to provide service level capability to a customer and its end users, such as a utility and its remotely located smart meters.

The network functionality of a particular slice may be implemented by downloading and instantiating as a virtual network function (VNF) certain network functionality from cloud-based resources to one or more existing network nodes or points of presence (PoP). A given PoP may have downloaded and instantiated thereon one or more than one VNF, each corresponding to one or more than one slice. When the functionality is no longer appropriate, the corresponding VNF may be terminated or deactivated or modified to reflect more appropriate functionality.

The identification of which nodes should be instantiated with which VNFs in order to provide a desired service level capability for a given slice is typically manually provisioned, involving considerable time and effort.

Methods and systems that reduce the amount of manual provisioning in this activity, so as to maximize flexibility and responsiveness of the network to changing customer demands would be desirable.

BRIEF DESCRIPTION OF THE DRAWINGS

Examples of the present disclosure will now be described by reference to the following figures, in which identical reference numerals in different figures indicate identical elements and in which:

FIG. 2 is a table showing an example listing of available service types and specifying structural and performance attributes for each service type specified, in a service level description (SLD) of a desired service, by a customer to the function identifier of FIG. 1;

FIG. 3 is a table showing an example of how the function identifier of FIG. 1 can identify network functions (NFs) for each service type from the SLD of FIG. 2;

FIG. 7 is a table showing how the graph generator of FIG. 1 can generate network graph descriptions for each identified NF using the SLD of FIG. 2 and the primitive SLGs of FIG. 4;

FIG. 13 is a chart showing an example mapping rule set for application to service level description information to map onto an available network function for use in conjunction with the example of FIG. 12;

FIG. 14 is a chart showing an example expansion rule set for application to service level description information to identify a basic network graph element that can be expanded into a segment graph suitable for use in conjunction with the example of FIG. 12;

SUMMARY

Figure 1:
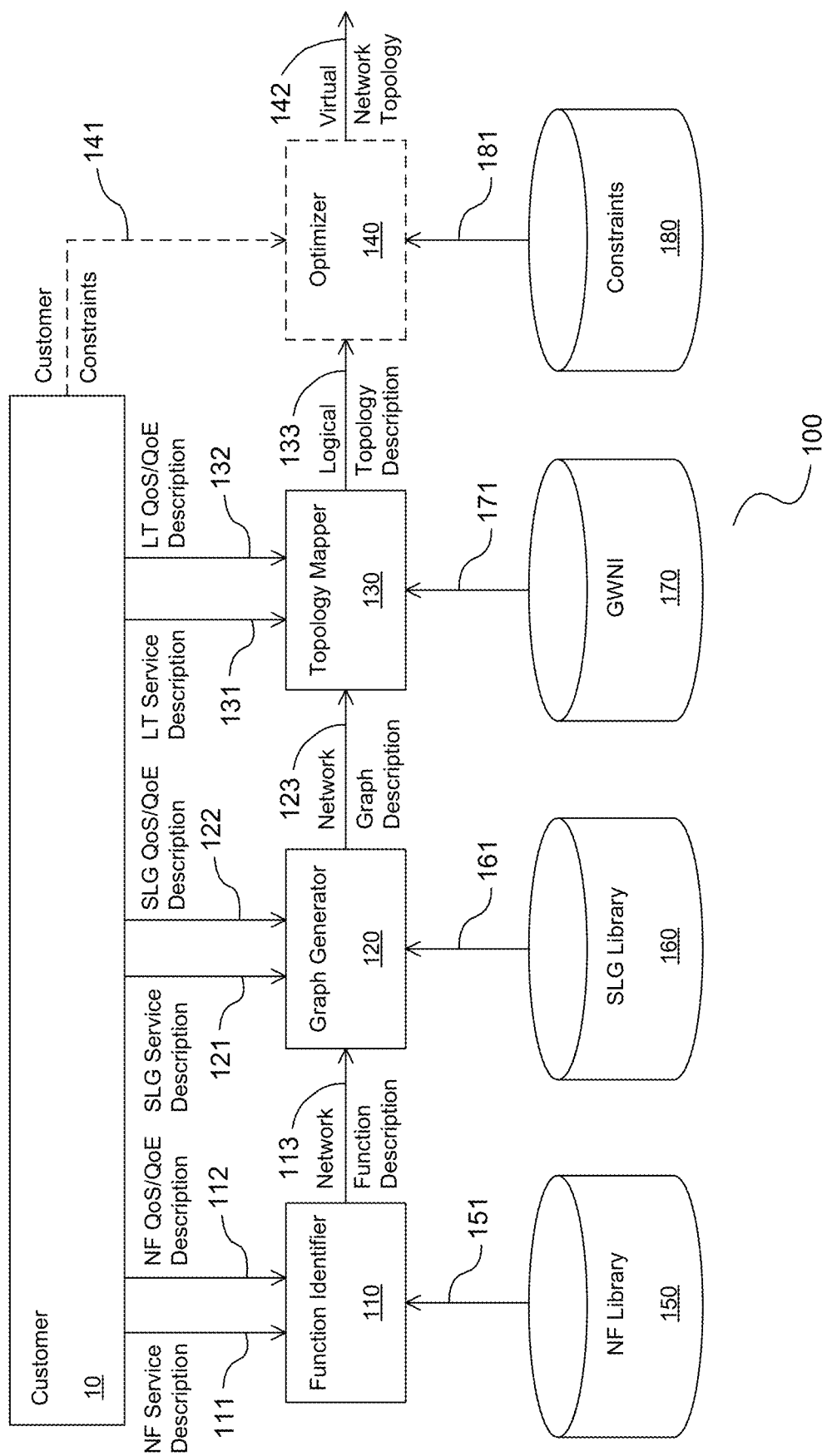
FIG. 1 is a block diagram of an example configuration of an SDT controller for determining a SDT in a user plane according to an example of the present disclosure.

The present disclosure discloses a method and apparatus for determining a network topology of wireless communications resources in the data plane for providing a service. The determination involves using customer-specified information to identify NFs suitable for providing the service, identifying an SLG that models the service using the NFs and customer-specified information and mapping the network graph into a logical topology using the SLGs and customer-specified information.

According to an example of the present disclosure there is disclosed a controller for determining a topology for a network providing a service. The controller comprises a function identifier, a graph generator and a mapper. The identifier is coupled to an SLD associating the service with at least one service type and a library of NFs. The identifier identifies at least one NF in the library for each service type. The generator is coupled to the SLD and a library of primitive SLGs representing at least one data flow between directly-coupled resource entities. The generator associates at least one primitive SLG to each identified NF. The mapper is coupled to the SLD and a map of network infrastructure elements. The mapper maps at least one resource entity of a primitive SLG onto an available network infrastructure element.

The SLD can comprise information regarding resource entities. The SLD can be customer-supplied. The information can be structural attributes about the resource entities and/or performance attributes of the service. The structural attributes can be device attributes, communication attributes and/or traffic attributes. The performance attributes can be QoS measurable attributes, QoS non-measurable attributes, QoS commitments and/or QoE attributes. The resource entity can be an end-user device, a customer entity and/or an INSF coupled to a plurality of primitive SLGs. The mapped resource entity can be a customer entity and/or an INSF. The customer entity can comprise a server and/or a data center (DC). A plurality of primitive SLGs can be coupled at an INSF. The INSF can be instantiated at multiple PoPs and/or repeated in a layered structure a plurality of times. The available infrastructure element can comprise a PoP. The controller can comprise a topology optimizer. The optimizer can form part of the mapper. The optimizer can be subject to a customer-supplied location of a resource entity, a customer-supplied constraint, a traffic engineering (TE) constraint, a function placement constraint, a node activation constraint, a horizontal recursion constraint, a function conflict constraint, a function grouping constraint, a function processing load constraint, a function count constraint and/or a compute resource constraint.

According to an example of the present disclosure, there is disclosed a method for determining a topology for a network providing a service. The method comprises actions of identifying at least one NF from an SLD, associating a primitive SLG representing at least one data flow between directly-coupled resource entities with each identified NF, and mapping at least one resource entity of a primitive SLG onto an available network infrastructure element. The action of identifying can comprise obtaining information regarding resource entities from an SLD and can comprise associating the service with at least one service type and identifying at least one NF for each service type. The action of generating can comprise obtaining information regarding resource entities from an SLD. The resource entities can be an end-user device, a customer entity and/or an INSF coupled to a plurality of primitive SLGs. The action of generating can comprise coupling a plurality of primitive SLGs at an INSF. The action of generating can comprise instantiating the INSF at multiple PoPs and/or repeating the INSF in a layered structure a plurality of times. The action of generating can comprise linking together primitive SLGs at common INSFs. The action of mapping can comprise obtaining information regarding resource entities from an SLD. The action of mapping can comprise associating the resource entity with a PoP. The method can comprise an action of optimizing the topology. The action of optimizing can comprise providing performance improvements to the service and/or the overall network. The performance improvements can comprise reducing a number of activated nodes, increasing total traffic, increasing a minimum service traffic rate, reducing cost and/or increasing revenue. The action of optimizing can comprise actions of constructing an augmented service function chaining (SFC) graph, formulating an optimization problem, bootstrapping through relaxation, filtering by enforcing function constraints, and/or removing function instances by greedy selection. The function constraint can be a function conflict constraint and/or a function grouping constraint.

According to an example of the present disclosure, there is disclosed a computer program product having a computer program stored thereon, containing computer-readable program instructions that, when executed by a processing unit in a controller, cause the controller to perform actions. The actions comprise identifying at least one NF from an SLD, associating a primitive SLG representing at least one data flow between directly-coupled resource entities to each identified NF, and mapping at least one resource entity of a primitive SLG onto an available network infrastructure element.

In an aspect of an embodiment of the present invention, there is provided a method for determining a topology for service offering in a network, the method comprising: identifying a set of network function (NF) in accordance with a service level description (SLD) associated with the service offering; selecting service level graph (SLG) primitives in accordance with each identified NF, and an ordering associated with the identified set of NFs, the primitive defining data flow between initial and terminating resource entities; and in accordance with the selected SLG primitives, and a known logical topology, mapping at least one resource entity associated with an SLG primitive to a logical node within the network.

In an embodiment of the first aspect the method can include receiving the SLD from a customer, where optionally, the received SLD further specifies an application function. In another embodiment, selecting SLG primitives is performed in accordance with the specified application function. In another embodiment of the present invention, identifying a set of NFs comprises obtaining information regarding resource entities from the SLD. In a further embodiment, selecting SLG primitives is performed in accordance with the SLD. In another embodiment, the resource entities are selected from a listing comprising: an end-user device, a customer entity and an in-network service function (INSF) coupled to a plurality of primitive SLGs. In a further embodiment, selecting the SLG primitives further includes linking the selected SLG primitives in accordance with the ordering of the network functions. In another embodiment, mapping at least one resource entity associated with an SLG primitive to a logical node includes mapping each of the resource entities associated with the selected SLG primitives to a Point of Presence (PoP) associated with the network, and optionally mapping each of the resource entities to a PoP is performed in accordance with a known logical topology of the network. In another embodiment, mapping the at least one resource entity includes defining a logical topology of the service offering.

In a further embodiment, the method further comprises optimizing the topology. Optimizing the topology may comprise providing performance improvements to at least one of the service and the network. The performance improvements, in some embodiments, can be selected from a list comprising: reducing a number of activated nodes, increasing total traffic, increasing a minimum service traffic rate, reducing cost and increasing revenue. In another embodiment, optimizing comprises at least one of: constructing an augmented SFC graph; formulating an optimization problem; bootstrapping through relaxation; filtering by enforcing function constraints; and removing function instances by greedy selection. In a further embodiment, the function constraint can be a function conflict constraint and/or a function grouping constraint.

In another aspect of an embodiment of the present invention, there is provided a Software Defined Topology (SDT) controller, for defining the topology of a service offering on a network. The SDT controller can comprise a network interface, a processor and a memory. The network interface can transmit to and receive from nodes connected to the network. The memory stores instructions that when executed by the processor cause the SDT controller to: identify a set of network function (NF) in accordance with a service level description (SLD) associated with the service offering; select service level graph (SLG) primitives in accordance with each identified NF, and an ordering associated with the identified set of NFs, the primitive defining data flow between initial and terminating resource entities; in accordance with the selected SLG primitives, and a known logical topology, map at least one resource entity associated with an SLG primitive to a logical node within the network; and transmit an instruction to the logical node in the network, over the network interface, to instantiate a function defined by the associated resource entity.

In an embodiment, the SLD is received over the network interface from a customer. In another embodiment, the SLD further specifies an application function, and wherein the instructions further include instructions to select SLG primitives in accordance with the application functions. In a further embodiment, the instructions to map at least on resource entity include instructions to map each of the resource entities associated with the selected SLG primitives to a Point of Presence (PoP) associated with the network.

DESCRIPTION

Network virtualization provides a network operator with the ability to customize the configuration of its network to provide customer-specific service offerings that suit the present demands of the operator's customers. The demands may be identified by the customer, in some cases with assistance from the network operator.

Such services may be implemented in a network slice comprising one or more VNFs that provide network functionality that makes up the service. Such VNFs may be instantiated on PoPs to which the operator has access and that have capacity to support the desired VNF functionality and that are geographically located in a manner that is appropriate to support the customer and its end-users.

In some examples, the VNFs may incorporate one or more virtual service functions (VSF). In some examples, the VSFs may be provided as part of one or more service function chains (SFC). In some examples, the SFCs define chaining constraints. In some examples, the VSFs may be defined by the customer to reflect service business logic that may or may not be known to the operator. In some examples, the VSFs may be provided by the customer to the operator as a library for instantiation as or as part of one or more VNFs. In some examples, the operator may add one or more NFs to the customer-supplied SFCs. The VNFs comprising VSFs and/or NFs may be downloaded and instantiated from the operator's cloud-based resources as, when and where appropriate to support the service.

When the demands of the service changes, the functionality of existing VNFs in a slice may be modified and/or terminated on a given PoP, migrated to other PoPs and/or replicated on additional PoPs, and/or new VNFs may be instantiated to provide additional functionality on additional PoPs.

As such, network virtualization may provide efficiencies in the deployment and use of the operator's infrastructure resources. Such efficiencies may be exploited by increasing the scope of services offered in a slice, increasing the number of slices offered to a given customer and by increasing the number of customers who can be supported. As the number and scope of services and of customers increases, further efficiencies may be obtained by managing the virtual network topology associated with a given service in a network slice, having regard to the demands of other network slices. Accordingly, the configuration of the resources associated with a slice may not be solely determined by the criteria identified by the customer.

It will be appreciated that generating a virtual network topology from a set of SLDs supplied by a customer can be a time consuming process. As the creation of slices is intended to be dynamic, a human-driven process is not likely to be appropriate. Furthermore, if it is intended to dynamically modify a slice's topology in response to customer and/or network demands, the process of defining a virtual network topology will benefit from automated creation and modification by management entities acting on behalf of a network operator.

As will be discussed below, an SLD is obtained from a customer. The SLD associates the requested service with and/or decomposes it into one or more service types and describes attributes of each service type. The attributes may be structural attributes that describe the resource entities that participate in the service type, how they communicate and the nature of data traffic emanating from or directed to such entities and/or performance attributes that describe the performance of the service type as a whole.

In some cases the customers may work with a network operator (not shown) to define or to refine the SLD. The SLD may take a variety of forms and contain a variety of information.

At a first stage, the SLD is analyzed to identify a network function (NF) that will be employed for each service type. The NFs can be selected from a predefined library of NFs.

At a second stage, the identified NFs for each service type and the structural and/or performance attributes associated with each of them are reviewed to generate an SLG for each service type. Each SLG may be made up of one or more SLG primitives (also referred to as primitive SLGs). The primitives originate and/or terminate at an INSF determined from the service level description. The SLG primitives and the INSFs may be instantiated at multiple PoPs and/or repeated in a layered structure a plurality of times to provide increased capability. When the primitive SLGs and the INSF are instantiated at multiple PoPs, it is known as horizontal re-occurrence. When the primitive SLGs and the INSF are repeated in a layered structure a plurality of times, in which an output of an earlier layer is coupled to an input of a later layer, it is known as vertical re-occurrence. The INSFs identify the processing actions that are performed at given stages within the service type. SLGs may be coupled at an INSF to form composite SLGs. The primitive SLGs may be may be taken from a predefined library of SLGs. The SLGs for each service type may be linked together at INSFs to build a linked network graph description that identifies the network functionality to be performed to give effect to the service but which is devoid of any geographic information.

Those skilled in the art will appreciate that the above described second stage can be viewed as an attempt to decompose each of the identified NFs into a set of SLG primitives that are connected to each other. This process may be recursive, so that a NF is decomposed into an SLG primitive and a simpler NF, and then the process is repeated until any remaining NF is an SLG primitive. This can result in a set of interconnected SLG primitives.

At a third stage, the SLD, including information about geographic distribution of the customer and its end-users, and any customer-imposed geographical constraints, conflict constraints, or grouping (collocation) constraints, is used, in conjunction with a know network topology to identify or select locations (in the form of available PoPs and other information about the general wireless network infrastructure (GWNI)) at which different INSFs could be instantiated, allowing the linked network graph to be mapped onto a physical network infrastructure. This allows for the definition of a virtual network topology. In embodiments where the customer service offering is being implemented within a network slice, the topology of the compute and connectivity resources allocated to the slice can be used as a set of logical locations at which the INSFs can be instantiated to create the logical topology corresponding to the set of interconnected SLG primitives.

At a fourth stage, which may be considered to form part of the third stage of processing, the virtual network topology may be tuned to optimize the performance of either or both of the slice giving effect to the service and the overall network. Examples of tuning the slice performance may include identifying additional INSFs that are not specified by the SLD and identifying where they may be instantiated to provide operational efficiencies.

The optimization performed at such fourth stage may comprise an iterative process that incorporates such techniques as criteria relaxation, enforcement of constraints, filtering and/or function displacement. In some examples, one or more or a subset of one or more of the second, third and fourth stages may be performed jointly and/or simultaneously.

FIG. 1 is a processing block diagram illustrating example blocks of an SDT controller, shown generally at 100, that processes information and resources to determine and apply a topology in the user plane for a given slice in a virtual network.

Figure 12:
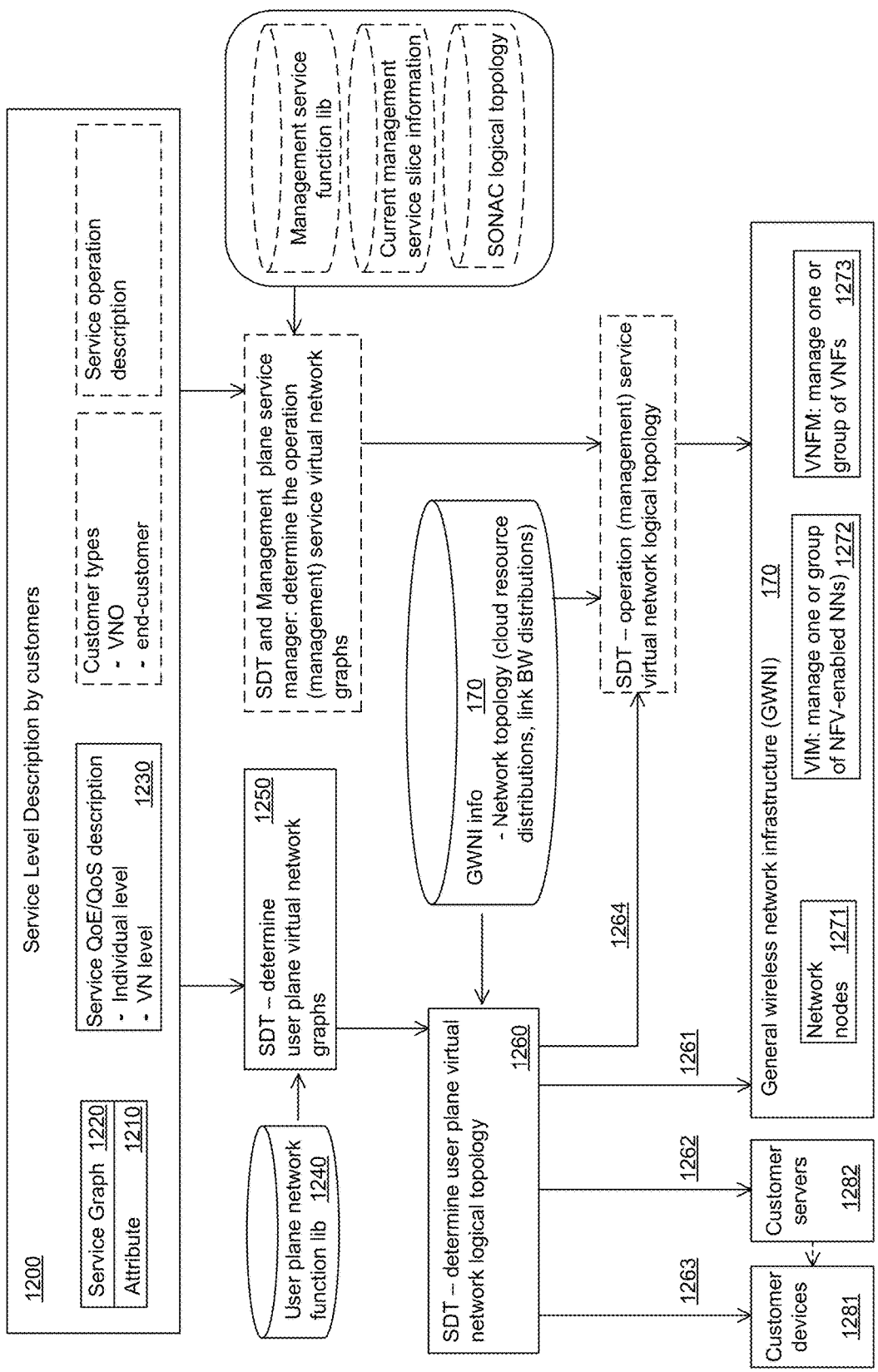
FIG. 12 is a processing block diagram of an example configuration of system and method for determining a software-defined topology (SDT) for a user plane according to an example of the present disclosure.

An alternative and complementary processing block diagram is shown in FIG. 12, illustrating how information and resources may be processed to determine and apply a logical topology for a given slice in a virtual network. The diagram shows processing for both the user plane logical topology and the management plane logical topology. The present disclosure concentrates on the user plane logical topology and the management plane logical topology. The present disclosure concentrates on the user plane logical topology and discloses a software-defined (SDT) controller that performs such processing.

The information and resources utilized for the user plane topology are shown in solid outline. The information and resources utilized for the management plane topology are not generally discussed herein and are shown in dashed outline.

The controller 100 comprises a function identifier 110, a graph generator 120 and a topology mapper 130. In some examples the controller 100 may comprise an optimizer 140. In some examples the optimizer 140 may form part of the mapper 130. The controller 100 further comprises and/or has access to a number of libraries, including an NF library 150, an SLG library 160, the GWNI 170 and a constraint library 180.

The identifier 110 accepts as inputs, an NF service description 111, an NF Quality of Service (QoS)/Quality of Experience (QoE) description 112 and one or more NFs 151 and generates an NF description 113.

The NF service description 111 and the NF QoS/QoE description 112 is obtained from a customer 10. The NF service description 111 and the NF QoS/QoE form part of an SLD provided by the customer 10. In some examples, the SLD may comprise a form or questionnaire maintained by the network operator and provided to the customer 10 to fill out. As such, the SLD may be updated and/or refined from time to time depending upon the capabilities available to be employed. The use of an operator-supplied form may allow the customer 10 to specify the SLD in a manner that may be processed automatically by the apparatus 100. At the same time, the use of such form may discipline the specification by the customer 10 of the SLD. The NFs 151 may be obtained from the NF library 150.

The SLD describes how the customer 10 views the desired service. The SLD may associate the expected processing within the desired service with and/or decompose it into one or more pre-defined service types. The description of a service type may, for example, identify the service type, what communication is performed by the service type and/or what the purpose and/or application is for the service type. For example, in FIG. 2, in which a non-limiting list of example service types is shown, a first service type designated "A" may be described as performing information collection for supporting an internet chat application.

The NF service description 111 identified by the customer 10 describes one or more structural attributes about such service type.

The structural attributes may describe, without limitation, the end-user devices, customer entities and/or (customer-supplied) INSFs ("resource entities"), the manner of communication and/or potential traffic sources to be supported by each service type.

Device attributes describe each resource entity that is expected to perform processing in the context of the service type. Device attributes may describe, without limitation, the resource entity (for example, whether the resource entity is a end-user device (such as a wireless device), a customer entity (such as a server and/or a data center (DC)) and/or an INSF (which may or may not be customer-identified). In this context, a wireless device refers to a device that connects to the wireless network, whether or not the device also has a wireline connection.

In some examples, the device attributes may identify customer-imposed constraints on the location of such resource entities. Device attributes may also describe the entity's mobility (for example, whether fixed or mobile), capabilities (for example, cloud resources, what radio access technology (RAT) specification interfaces it has, whether it has GPS and/or is Service-Oriented Virtual Network Auto-Creation (SONAC)-configurable and/or can support a given communications protocol), power capacity (for example, unlimited (e.g. connected to a power-line) or limited and if so, to what extent); density (for example generic high, medium and/or low (H/M/L) indications) and/or geographic distribution.

Communication attributes describe how communication with each entity occurs within the service. Such attributes may describe, without limitation, the communication scale (for example, local (i.e. at or proximate to a network edge) or remote), distance, direction and/or manner of communication (for example, unicast, multicast, broadcast).

Traffic attributes describe the nature of data traffic emanating from each entity, including, without limitation, its burstiness (for example, tending to be bursty and/or a relatively continuous stream).

The NF QoS/QoE description 112 may comprise a number of attributes that describe the desired performance of each service type identified by the customer 10. Such performance attributes may describe, without limitation, QoS measurable attributes, QoS non-measurable attributes, QoS commitments and/or QoE attributes.

The QoS measurable and QoS non-measurable attributes may be considered to be attributes of QoS for a given data communication performed in the context of the service type.

QoS measurable attributes describe performance attributes that may be objectively quantified and/or measured, of data communications associated with the functional block that are of interest for QoS (and by extension QoE) calculations. Such attributes may describe, without limitation, the data rate (for example, threshold and/or target value and/or H/M/L indications), coverage (for example, threshold and/or target value and/or percentage and/or H/M/L indications), latency (for example, threshold and/or target value and/or percentage and/or H/M/L indications) and/or communication reliability (for example, threshold and/or target percentage and/or H/M/L indications).

QoS non-measurable attributes describe performance attributes of data communications associated with the service type that are of interest for QoS (and by extension, QoE) calculations, but which may not necessarily be objectively quantified and/or measured. Such attributes may describe, for example, a level (for example, a H/M/L indication and/or rank), but may not identify a quantitative threshold and/or target value and/or percentage. Non-limiting examples of such non-measurable attribute are privacy, which may have only a H/M/L indication and TE, which may have an indication of "best efforts", signifying that TE does not have to be implemented.

QoS commitments describe the commitment that the customer is requesting and that the network operator is prepared to provide to meet identified QoS measurable and/or non-measurable attributes of the service type. Such QoS commitments may describe, in respect of QoS measurable and/or non-measurable attribute, a percentage of a threshold and/or target value will be guaranteed and/or only that best efforts will be made to meet such threshold and/or target value.

QoE attributes describe attributes that are of interest for QoE (as opposed to QoS) purposes for each service type. The QoE attributes may be considered to be attributes of overall customer (that is, for all customers or for an entire customer group), service and/or virtual network QoE, as opposed to at the level of an individual communication as is the case with the QoS attributes. The QoE attributes may describe, without limitation, an outage rate (for example, threshold and/or target percentage and/or a H/M/L indication, throughput per area (per type of communication (for example, unicast, multicast, broadcast and/or anycast) (typically measured in terms of throughput per square kilometer) and/or latency status (per type of communication (for example, bursty and/or stream) (for example, threshold and/or target percentage and/or a H/M/L indication).

In this context, unicast, multicast, broadcast and anycast refer to mechanisms for communication in which a source node communicates with one or more a plurality of destination nodes coupled to the source node. In broadcast communication, the source node transmits an identical message to each of the plurality of destination nodes. Multicast communication is similar to broadcast, but only those destination nodes that subscribe to a multicast group will receive the message. In unicast communication, the source node transmits the message to a particular one of the destination nodes. In anycast communication, the source node transmits the message to one and only one of the destination nodes, without specifying which node is the one. Rather which node is chosen is up to the routing implementation, for example, the one having a shortest routing distance or the one having least load. Broadcast, multicast and unicast network communications are available in IPv6 and IPv4, whereas anycast communication is not available in IPv4.

Whether or not the SLD is provided as a customer-completed form or questionnaire, in some examples, the listing of available pre-defined service types with associated NF service description 111 and NF QoS/QoE description 112 may be set up or depicted in a printed or computer table or form. A non-limiting example of such form for a non-limiting example service is shown in FIG. 2. In some examples, the customer may simply select the service type(s) applicable to the desired service and complete the SLD information for the selected service type(s).

A non-limiting example of such form for a non-limiting example service offering is shown in FIG. 2. The form 200 comprises a number of columns and a number of rows. With the exception of headers, each row 201-207 corresponds to one of the available service types. Within each row, columns correspond to different aspects and/or attributes of the service type being described. Some of these aspects and/or attributes that are shown in the columns 241-244, 250 are operator-defined as part of the service level description 111. In some examples, the customer completes the columns 241-244, 450 as part of providing the NF service description 111. Other columns in the form 200, for example, 210, 220, 230 are pre-defined for each service type and filled in before the customer completes the form.

A column 210 identifies the service type ID. A column 220 identifies what communication the service type performs. A column 230 identifies a purpose and/or application attributed to the service type. In some examples, these columns 210-230 are provided for reference and consideration by the operator when completing the NF service description 111. A number of columns 240-244 identify attributes of the NF service description 111, for example, device attributes 240-242, communication attributes 243 and/or traffic attributes 244. In some examples, one or more attributes may be described in a common column, such as, for example, column 240, which contains information about mobility and power capacity. A number of columns 250 identify attributes of the NF QoS/QoE description 112. A column 260 describes the type of network processing that is performed by the service type. In some examples, such network processing is operator-specified according to the network conditions. In some examples, such network processing is dependent upon the information provided by the operator in the NF service description 111.

The NFs 151 describe various user plane functions that may be implemented by software downloaded to one or more network nodes such as PoPs to perform certain network actions. In some examples, the NFs 151 include, without limitation, packet aggregation (PA), packet dispenser (PD), anchor point (AP), virtual switch (VS), point to multi-point switch (PtMP), radio transport protocol convergence (RTPC), key material holder (KMH), transport protocol translation (TPT), load balancing (LB), deep packet inspection (DPI) and/or firewall (FW) functions. The NF library 150 may define a set of pre-defined available NFs 151. It will be appreciated that the NF library 150 may be modified from time to time to define and/or add new and/or remove old NFs 151 as appropriate.

The PA function may collect and/or concatenate data in the form of a message or information from multiple sources. The PD function may deliver a message or information to multiple destinations. The AP function may hold and/or process data, whether in the upload (UL) or download (DL) or both directions. The AP function may provide mobility and/or power-efficient state support. The VS function may forward data whether or not upon satisfaction of a condition. The PtMP switch function may change the manner in which data is delivered to multiple destinations between unicast and broadcast transmission. The RTCP function may converge multi-access link (AL) interfaces potentially having different AL specifications into a unified data format at a convergence point. The KMH function may provide network access protection. The TPT function may provide transport protocols. The LB function may provide load balancing among PoPs and their interconnecting network links. The DPI function may provide a network security capability. The FW function may provide selective access to information coming from a network. It will be appreciated that other NFs 151 may be already known or become apparent upon consideration of the present disclosure.

The identifier 110 can review the NF service description 111 and NF QoS/QoE description 112 for each service type selected by the operator in the service level description and generates the NF description 113, which comprises one or more NFs 151 from the NF library 150 that will implement such service type.

Each NF 151 describes processing that may be performed by the GWNI 170 to provide functionality within a slice.

The identification by the identifier 110 of one or more NFs 151 that will be performed in providing the service as described in the SLD for each service type is illustratively depicted in the form 300 in FIG. 3, in which additional columns 360, 370 are appended to the form 200 shown in FIG. 2 for the specification of a network processing description and appropriate NFs 151.

In some examples, a plurality of NFs 151 is identified for a single service type. In some examples, an NF 151 is identified for each of the uplink (UL) and/or downlink (DL) communication directions, where in this context, the direction from a wireless device to a server is denoted as the UL.

The generator 120 accepts as inputs, the NF description 113, an SLG service description 121, an SLG QoS/QoE description 122 and one or more SLGs 161 and generates a linked network graph description 123.

Thus, a first processing action 1250 by the SDT controller is to identify a user plane virtual network graph that models the service offering based on analysis of the SLD and suitable NFs 151.

Each of the actions that are contemplated by the SLD in the performance of the service offering is identified and mapped into an available NF 151.

In some examples, this mapping may be achieved by establishing a mapping rule set that is applied to the SLD information relating to a given entity and its interactions to identify and select suitable available NFs 151 for the entity and its interactions to be mapped into. A non-limiting example of such a rule set is shown in FIG. 13.

The mapping rule set is shown in the form of a table 1300, in which each rule is set out in a row. Within each row, the first column 1310 is allocated to service graphs 161, one or more columns 1320, 1350, 1360 are allocated to one or more device attributes, one or more columns 1330 are allocated to communication attributes and one or more columns 1340 are allocated to traffic source attributes, which form part of the SLD. The NF 151 selected by each rule (row) is allocated to the last or right-most column 1320.

In some examples, additional columns may be allocated to identify additional criteria provide by network operators upon which the rule may be conditioned to identify a suitable NF 151. Such additional criteria may comprise, without limitation, certain network attributes (allocated in FIG. 13 to the seventh column 1370).

Within each row, if a column has a condition identified (by way of non-limiting example, in the first, fifth and sixth rows, the column 1330 allocated to communication attributes shows "remote"), such condition is to be satisfied by the allocated attribute or criterion in order to arrive at the NF 151 selected by the rule. If, however, a column is blank or shown as NA (not applicable), the rule is not conditioned on the allocated attribute or criterion in arriving at the NF 151 selected by the rule.

Once each action in the service offering has been mapped into one or more NFs 151, each of the NFs 151 so identified is expanded into a primitive SLG 410-480 and/or a composite SLG 490.

Each SLG 410-480, 490 may comprise one or more instantiations of an SLG 410-480, 490.

The SLG service description 121 and the SLG QoS/QoE description 122 form part of the SLD provided by the customer 10. In some examples, the SLG service description 121 and/or the SLG QoS/QoE description 112 may contain identical information as the NF service description 111 and the NF QoS/QoE description 112 respectively. In some examples, the SLG service description 121 and/or the SLG QoS/QoE description 122 may have one or more items and/or attributes in common with the NF service description 111 and the NF QoS/QoE description 112 respectively. In some examples, the SLG service description 121 and/or the SLG QoS/QoE description 122 may be organized according to the service type(s) of the service as identified by the customer 10.

Figure 4:
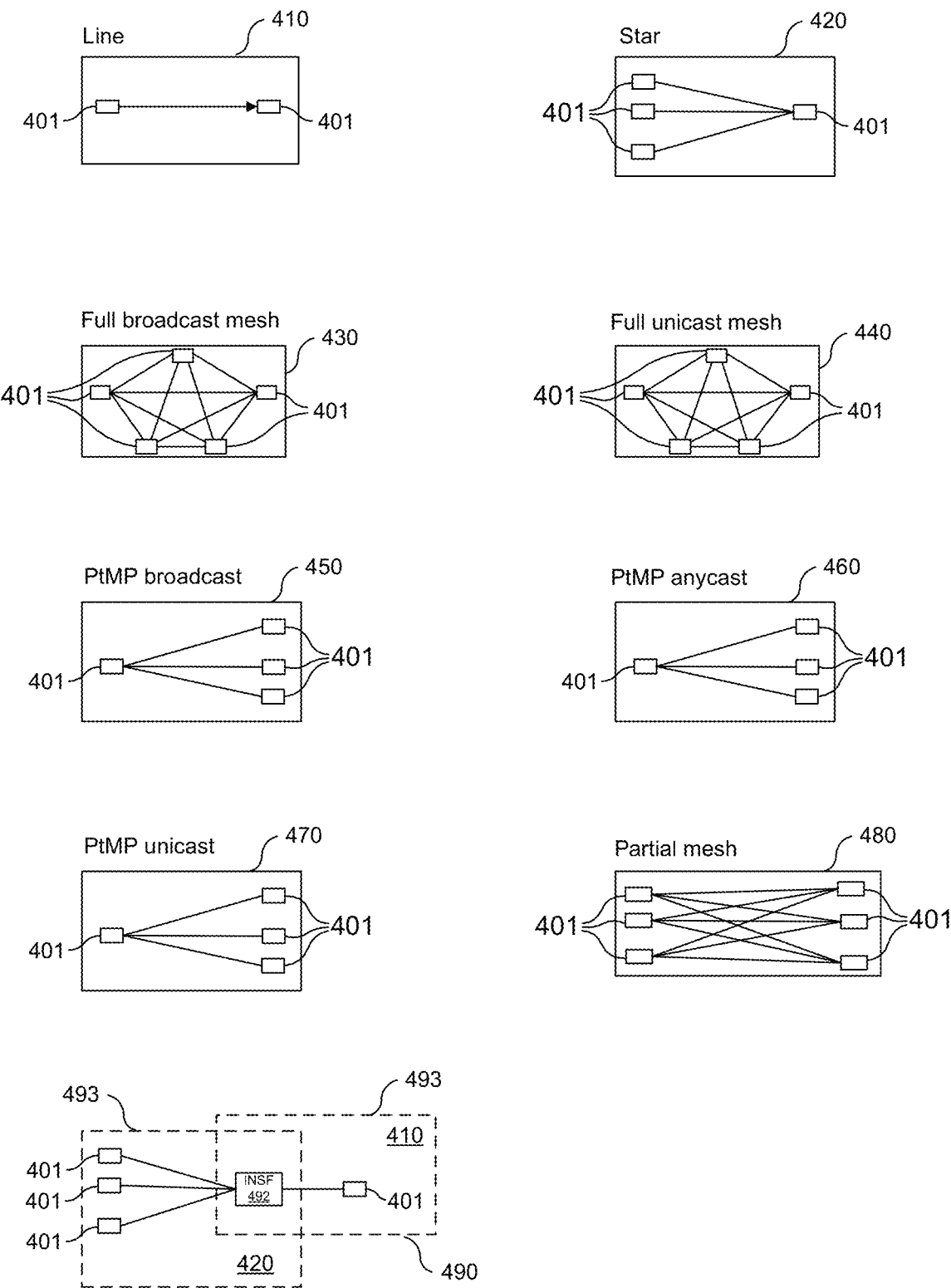
FIG. 4 is a diagram showing example primitive service level graphs (SLGs) from which the graph generator of FIG. 1 can generate a network graph description from the identified NFs using the SLD of FIG. 2.

Each SLG 161 describes at least one data and/or communication flow from a first resource entity 401 and at a second resource entity 401. Those skilled in the art will appreciate that within an SLG primitive there will be at least one initial resource entity, and at least one terminating resource entity. A number of such SLGs 161 are known as primitive SLGs 410-480. They describe data traffic between directly-coupled entities 401. Non-limiting examples of primitive SLGs 410-480 are shown in graphical form in FIG. 4. They include, without limitation, a line 410, star 420, full broadcast mesh 430, full unicast mesh 440, PtMP broadcast 450, PtMP anycast 460, PtMP unicast 470 and partial mesh SLG 480.

The SLG library 160 may define a set of pre-defined available primitive SLGs 410-480. It will be appreciated that the SLG library 160 may be modified from time to time to define and/or to add new and/or remove old primitive SLGs 410-480 as appropriate.

The line SLG 410 describes point-to-point communications between two entities 401. The line SLG 410 may be suitable, for example, for direct communications between two entities 401.

The star SLG 420 describes communications between a group of (M) first entities 401 and a common second entity 401, where M is any natural number. The star SLG 420 may be suitable, for example, for machine-to-machine (M2M) communications or machine-type communication (MTC) in which a plurality of (M) smart readers (the group of (M) first entities 401) provide information for collection by a server (the second entity 401) and the server provides control and/or instruction to the readers.

The full broadcast mesh SLG 430 describes communications between a plurality of (P) entities 401, in which each entity 401 may broadcast to each other entity 401, where P is any natural number. The full broadcast mesh SLG 430 may be suitable, for example, for private social networks, including without limitation, providing a conference call capability.

The full unicast mesh SLG 440 describes communications between a plurality of (Q) entities 401, in which each entity 401 may communicate in a unicast manner with each other entity 401, where Q is any natural number. The full unicast mesh SLG 440 may be suitable, for example, for mobile broadband (MBB) communications.

The PtMP broadcast SLG 450, the PtMP anycast SLG 460 and the PtMP unicast SLG 470 each describe communications between a first entity 401 and a plurality of (N) second entities 401, where N is any natural number. The first entity 401 may broadcast, anycast or unicast to each of the (N) second entities 401. The PtMP broadcast SLG 450 may be suitable, for example, to provide a network assistant capability and/or for local car-to-car (C2C) communications. The PtMP anycast SLG 460 may be suitable, for example, for content access from any of a plurality of (N) caches.

The partial mesh SLG 480 describes communications between a plurality of (M) first entities 401 and a plurality of (N) second entities 401. Each of the (M) first entities 401 may communicate (in unicast manner) to each of the (N) second entities 401. The partial mesh SLG 480 may be suitable, for example, for content distribution from multiple servers, or for general Internet communications in which there are multiple gateways (GW) to the Internet.

It will be appreciated that other primitive SLGs 410-480 may already be known or become apparent upon consideration of the present disclosure.

Figure 5:
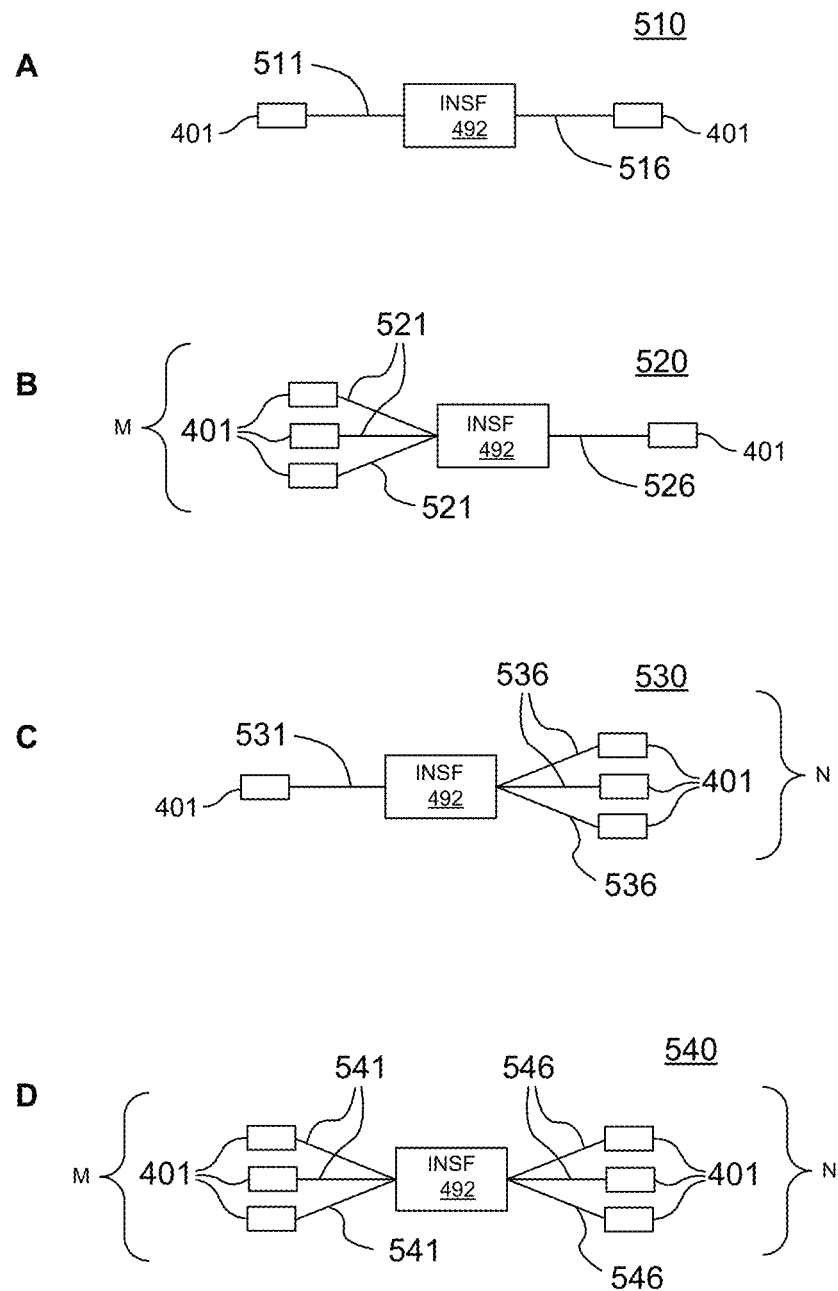
FIG. 5 is a diagram showing example composite SLGs made up of SLGs, including the primitive SLGs of FIG. 4, which join at an in-network service function (INSF)

In addition to the primitive SLGs 410-480, composite SLGs 490 describe data traffic between entities 401 with at least one intervening INSF 492, which may include a customer-specified INSF 492. Such composite SLGs 490 may be understood to be decomposable into a plurality of SLGs 493 coupled at an INSF 492. Some non-limiting examples of composite SLGs 490 are shown in graphical form in FIG. 5 and include a line+line SLG 510, a star+line SLG 520, a line+PtMP (broadcast/anycast/unicast) SLG 530 and a star+PtMP (broadcast/anycast/unicast) SLG 540.

In the line+line SLG 510, the INSF 492 may provide, for example, a per-device mobility AP capability. For example, the INSF 492 may perform user-specific filtering of messages and/or data received from an entity 401 along a link 511 and selectively passes on certain of the messages/data to another entity 401 along a link 516 in accordance with customer-supplied criteria.

In the star+line SLG 520, the INSF 492 may provide, for example, traffic integration and/or aggregation capability. For example, the INSF 492 may collate information statistics from a plurality of (M) entities 401 along links 521 and/or perform analytics thereon in accordance with customer-supplied criteria and forward the results to another entity 401 along link 526.

In the line+PtMP (broadcast/anycast/unicast) SLG 530, the INSF 492 may provide a PtMP broadcast/anycast/unicast capability. For example, the INSF 492 may process the information received from an entity 401 along a link 531 in accordance with customer-supplied criteria and then broadcasts it to (N) other entities 401 along links 536.

In the star+PtMP (broadcast/anycast/unicast) SLG 540, the INSF 492 may provide an MxN virtual switch (VS) capability. For example, the INSF 492 may collate information statistics from a plurality of (M) entities 401 along links 541, and/or perform analytics thereon in accordance with customer-supplied criteria and broadcast/anycast/unicast the results to (N) other entities 401 along links 546.

It will be appreciated that, in some respects, the line+line SLG 510 may be seen as a particular example of the star+PtMP (broadcast/anycast/unicast) SLG 540, with N=1 and M=1, the star+line SLG 520 may be seen as a particular example of the star+PtMP SLG 540, with M=1 and the line+PtMP SLG 530 may be seen as a particular example of the star+PtMP SLG 540, with N=1.

It will also be appreciated that other composite SLGs 490 may already be known or become apparent upon consideration of the present disclosure.

In some examples one or more of the decomposed SLGs 493 is itself a composite SLG 490, which in turn can be further decomposed into a plurality of SLGs 493 coupled at an INSF 492. Thus, because of such recursive nature of composite SLGs 490, it may be appreciated that some SLGs 161 may be capable of performing quite complex processing at one or more INSFs 492.

In some examples, the customer 10 may identify the customer-identified INSF 492 as part of the SLD. In some examples, the controller 100 may identify the benefit of interposing an INSF 492 between SLGs 493.

Further, an SLG 161 and its associated INSF 492 can be instantiated at multiple PoPs and/or repeated in a layered structure a plurality of times to model even greater capabilities within a service type. Such duplication is known as re-occurrence. Horizontal re-occurrence refers to the instantiation of the INSF 492 at multiple PoPs, where the multiple instance all map to a common function in an SFC. Vertical re-occurrence refers to the repetition in a layered structure of the SLG 161 and INSF 492 a plurality of times. In some examples, vertical re-occurrence reflects a change in an SFC in that a new function is inserted therein. In some examples, additional INSF(s) 492 may be introduced between adjacent layers of repeated INSFs) 492. An INSF 492 in a composite SLG 490 may have a number (K) of horizontal re-occurrences and a number (L) of vertical re-occurrences in the segment graph, where K and L can be any natural number.

Figure 6:
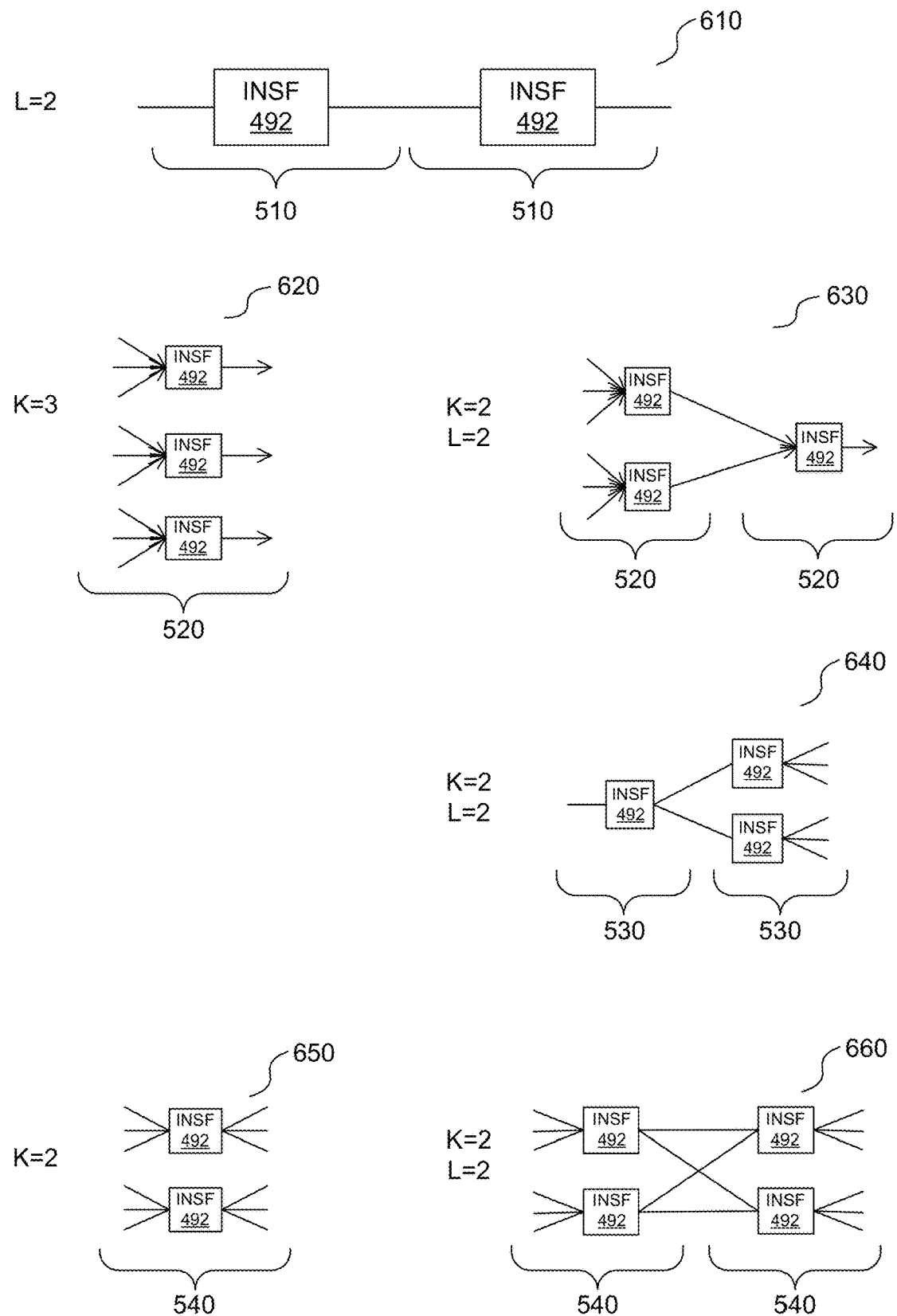
FIG. 6 is a diagram showing examples of horizontal and/or vertical re-occurrences of the INSFs of FIG. 5.

Five non-limiting examples of re-occurrence of an INFS 492 in a composite SLG 490 are shown in FIG. 6. In the figure, the absence of arrows indicate that traffic flow and/or connectivity is bi-directional, whereas the use of arrows signifies a unidirectional traffic flow and/or connectivity in the indicated direction.

In the example shown generally at 610, the line+line SLG 510 re-occurs vertically with L=2, where an output of one SLG 510 is coupled to an input of another SLG 510.

In the example shown generally at 620, the star+line SLG 520 re-occurs horizontally with K=3

In the example shown generally at 630, the star+line SLG 520 re-occurs both horizontally with K=2 and vertically with L=2. It will be appreciated that because the star+line SLG 520 has multiple inputs 521 and only a single output 526, the horizontal re-occurrences result in multiple SLGs 520 on the left side, whereas the vertical re-occurrences result in only a single SLG 520 on the right side, since outputs 526 of the left-most two SLGs 520 are coupled to inputs 521 of the right-most single SLG 520.

In the example shown generally at 640, the line+PtMP SLG 530 re-occurs both horizontally with K=2 and vertically with L=2. It will be appreciated because the line+PtMP SLG 530 has a single input 531 and multiple outputs 536, the horizontal re-occurrences result in multiple SLGs 530 on the right side, whereas the vertical re-occurrence results in only a single SLG 530 on the left side, since outputs 536 of the left-most single SLG 530 are coupled to inputs 531 of the right-most two SLGs 530.

In the example shown generally at 650, the star+PtMP SLG 540 re-occurs horizontally with K=2.

In the example shown generally at 660, the star+PtMP SLG 540 re-occurs both horizontally with K=2 and vertically with L=2.

Other re-occurrence patterns with the same or different composite SLGs 490 may be already known or may become apparent upon consideration of the present disclosure. For example, such re-occurrence patterns may emulate or correspond to a MBB or MTC capability.

The generator 120 reviews the SLG service description 121 and SLG QoS/QoE description 122 for each service type identified in the SLD as well as the NF description 113 generated by the identifier 110 and generates a network graph description 123 for each service type.

The network graph description 123 for each service type comprises a primitive SLG 410-480 or composite SLG 490, with or without horizontal and/or vertical re-occurrences. In some examples, the network graph description 123 for each service type may be described using a short-hand notation. A non-limiting example of such a shorthand that may be appropriate for use is of the form:

FN-X(K,L)

where:

FN is an identifier that describes a NF 151 that performs such service type. In some examples, the identifier is similar to those by example shown in column 370 of FIG. 3;

X is an identifier that describes a primitive SLG 410-480 or composite SLG 490 that emulates the network capability associated with the NF 151. In some examples, the identifier is similar to those shown as an alphabetic letter in the example composite SLGs 510-540 in FIG. 5; and K, L are the number of horizontal and vertical re-occurrences of the primitive SLG 410-480 and/or composite SLG 490. In some examples, the number K, L may represent the exact number of re-occurrences. In some examples, the number K, L may represent a maximum number of re-occurrences. In some examples, the number K, L may represent a minimum number of re-occurrences. Thus, in some examples, a number of re-occurrences may be expressed as a range between a minimum value and a maximum value.

In some examples, a given service type may perform more than one NF 151, either sequentially, or in parallel (including, without limitation, in the UL and DL directions).

In some examples, the customer 10 may have been prompted, as part of the SLD, to identify one or more SLGs 161 for a given service type. Such customer-identified SLGs 161 are respected. Subject to this qualification, the generator 120 makes its own determination of appropriate SLGs 161 based on the available pre-defined primitive SLGs 410-480 in the SLG library 160 and its analysis of the SLG service description 121 and the SLG QoS/QoE description 122 and/or any customer-identified SLGs 161.

The generation of a network graph description 124 for each service type is illustratively depicted in the form 700 in FIG. 7, in which additional columns 780, 790 are appended to the form 300 shown in FIG. 3 for the specification, respectively of a primitive SLG 410-480 and of the network graph description 123 using the example short-hand described above.

The network graph descriptions 123 for each service type are linked together at INSFs 482 to build a linked network graph 123 that describes the network functionality that gives effect to the service offering represented by the network slice. It will be appreciated that the linked network graph description 123 is devoid of any geographic information as to the topology of the network slice.

In some examples, an expansion rule set may be established that is applied to the SLD information obtained to identify a suitable primitive SLG 410-480. A non-limiting example of such a rule set is shown in FIG. 14.

Such an expansion rule set is shown in the form of a table 1400, in which each rule is set out in a row. Within each row, the first column 1410 is allocated to service graphs 161, one or more columns 1420, 1440, 1450 are allocated to device attributes, one or more columns 1430 are allocated to traffic source attributes, one or more columns 1460, 1470 are allocated to service level QoE/QoS description attributes, all of which form part of the SLD. The primitive SLG 410-480 selected by each rule (row) is allocated to the last or right-most column 1490.

In some examples, additional columns may be allocated to identify additional criteria provided by network operators upon which the rule may be conditioned to identify a suitable primitive SLG 410-480. Such additional criteria may comprise, without limitation, the number of gateways (GWs) to the Internet or to servers 1282 (allocated in FIG. 14 to the eighth column 1480), and certain network process constraints (allocated in FIG. 14 to the ninth column 1485).

Within each row, if a column has a condition identified (by way of non-limiting example, in the first and second rows, the column 1440 allocated to device density shows "High"), such condition is to be satisfied by the allocated attribute or criterion to arrive at the primitive SLG 410-480 selected by the rule. If, however, a column is blank or shown as NA (not applicable), the rule is not conditioned on the allocated attribute or criterion in arriving at the primitive SLG 410-480 selected by the rule.

Once each NF 151 has been expanded into a primitive SLG 410-480 that, with their respective interconnections, make up the SLG 410-480, 490, the user plane virtual network graph for the slice has been identified and the processing action 1250 has been completed.

The mapper 130 accepts as inputs, the linked network graph description 123, a logical topology (LT) service description 131, an LT QoS/QoE description 132 and GWNI information 171 and generates an LT description 133.

The LT service description 131 and the LT QoS/QoE description 132 form part of the service level description provided by the customer 10. In some examples, the LT service description 131 and/or the LT QoS/QoE description 132 may contain identical information to the NF service description 111 (and/or SLG service description 121) and the NF QoS/QoE description 111 (and/or SLG QoS/QoE description 122) respectively. In some examples, the LT service description 131 and/or the LT QoS/QoE description 132 may have one or more items and/or attributes in common with the NF service description 111 (and/or SLG service description 121) and the NF QoS/QoE description 112 (and/or SLG QoS/QoE description 122) respectively.

The GWNI 170 may comprise physical network topology information including, without limitation, location of PoPs that may serve as resource entities 401, including customer entities (such as servers and/or DCs) and INSFs 492 (whether or not customer-identified) and information about the PoPs, including per-PoP function availability and processing load bounds. The GWNI 170 may also comprise information about interconnections between PoPs, cloud resource distributions, link bandwidth (BW) distributions on physical links and the like. In some examples, the GWNI 170 may contain statistical load, delay and capacity information between devices, including base stations (BS), routers and PoPs. In addition, the GWNI 170 may comprise information about the logical network slice for the service under consideration and other logical network slices and their infrastructure, processing and/or storage demands including nominal remaining network resources, physical link capacities and radio resources.

The mapper 130 maps at least one resource entity 401 in the linked network graph description 123 onto physical elements in the GWNI 170 using the GWNI information 171 in conjunction with the LT service description 131 and the LT QoS/QoE description 132 identified in the SLD provided by the customer 10, resulting in the LT description 133.

In particular, the mapper 130 assigns the identified customer entities and INSFs 492 to PoPs within the GWNI 170 that have available processing and/or storage capacity and satisfy any structural attributes specified in the LT service description 131 as well as any performance attributes specified in the LT QoS/QoE description 132.

Referring once again to FIG. 12, once the user plane virtual network logical topology has been so determined by processing action 1260, the SDT controller may configure the user plane virtual network logical topology. The configuration may in some examples involve three levels. First the identified NFs 151 may be instantiated at the mapped network nodes (NNs) 1271 in the GWNI 170. Second, the instantiated virtual network functions (VNFs) that handle specific network functions that run in one or more virtual machines on top of the GWNI 170 may be configured. Third, the logical links to the VNFs may be configured.

In some examples, the first level of configuration (instantiation of the NFs 151) may be achieved by communication 1261 with the GWNI 170. In some examples, the communication 1261 is directly with the NNs 1271. Alternatively, in some examples, the communication 1261 may be to one or more virtual infrastructure managers (VIMs) 1172 within the GWNI 170. A VIM 1172 may manager one or more network function virtualization (NFV)-enabled NNs 1171. In some examples, a data cloud (DC) may be abstracted as a single NFV-enabled NN 1171. In some examples, the user plane virtual network logical topology may cause the VIM 1172 to re-use interfaces that are conventionally defined in the European Telecom Standards Institute (ETSI) NFV standard.

Figure 15:
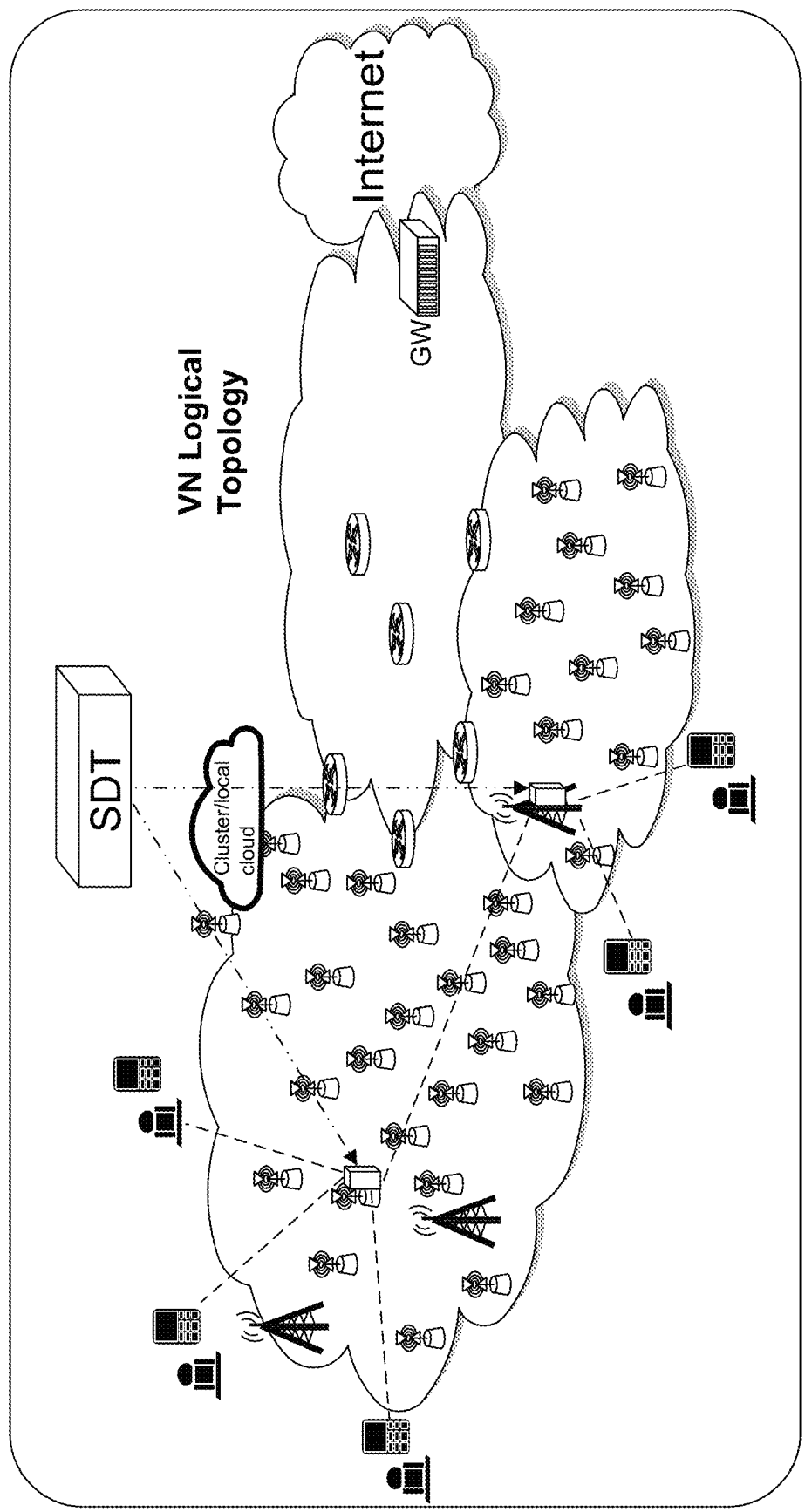
FIG. 15 is an example of configuration of one or more virtual infrastructure managers (VIMs) in conjunction with the example of FIG. 12.

In some examples, the second level of configuration (configuration of the VNFs may also be achieved by communication 1261 with the GWNI 170. In some examples, the communication 1261 is directly with the NNs 1271 that implement the VNF. Alternatively, in some examples, the communication 1261 may be to one or more VNF managers (VNFM) which in turn configure the NNs 1271. FIG. 15 shows an example of configuration of one or more VIMs.

Figure 16:
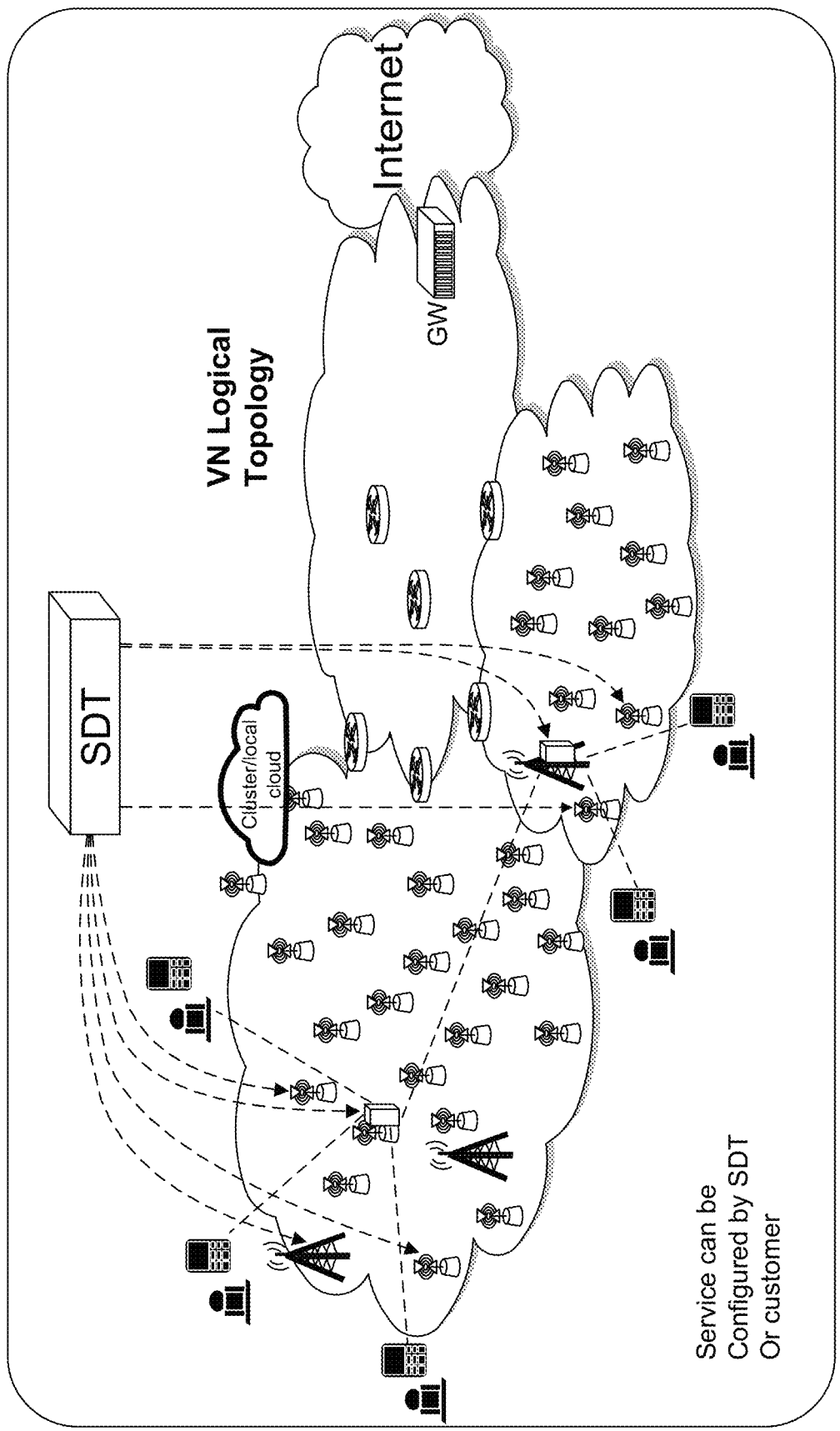
FIG. 16 is an example of logical links in conjunction with the example embodiment of FIG. 12.

In some examples, the third level of configuration (configuration of the logical links) may be achieved by communication 1261 with the GWNI 170, communication 1262 with the customer servers 1282 and communication 1263 with the customer devices 1281. FIG. 16 shows an example of configuration of one or more logical links.

The communications 1262, 1263, 1264 may comprise an identifier of the function for the next logical destination, an identifier of the service and, if the service offering is provided in a virtual slice, in which no physical link connection resource is called for, an identifier of the virtual slice.

In some examples, rather than providing such information 1263, 1264, the customer can be made responsible for configuring its devices in accordance with the SLD.

In addition to configuring the user plane virtual network logical topology, the SDT controller may provide the user plane virtual network logical topology 1261 to a further processor for determining an operation (management) service virtual network logical topology therefrom.

The optimizer 140 accepts as inputs, the LT description 133 and constraints 181 from the constraints library 180 and generates a virtual network topology 142. In some examples, the optimizer 140 may also accept customer-supplied constraints 141 which may form part of the service level description. If the optimizer 140 forms part of the mapper 130, the customer-supplied constraints 141 may form part of the LT service description 131 and/or the LT QoS/QoE description 132.

The optimizer 140 tunes the LT description 133 to improve the performance of the network slice that implements the service offering and/or the overall network performance. As a general rule, such performance improvements may include one or more of reducing the number of activated PoPs, increasing the total traffic rate, increasing the minimum service traffic rate, reducing cost (measured in terms of transport cost and/or computational cost) and increasing revenue (measured in terms of the difference between the performance supplied and the cost to implement it).

Figure 8:
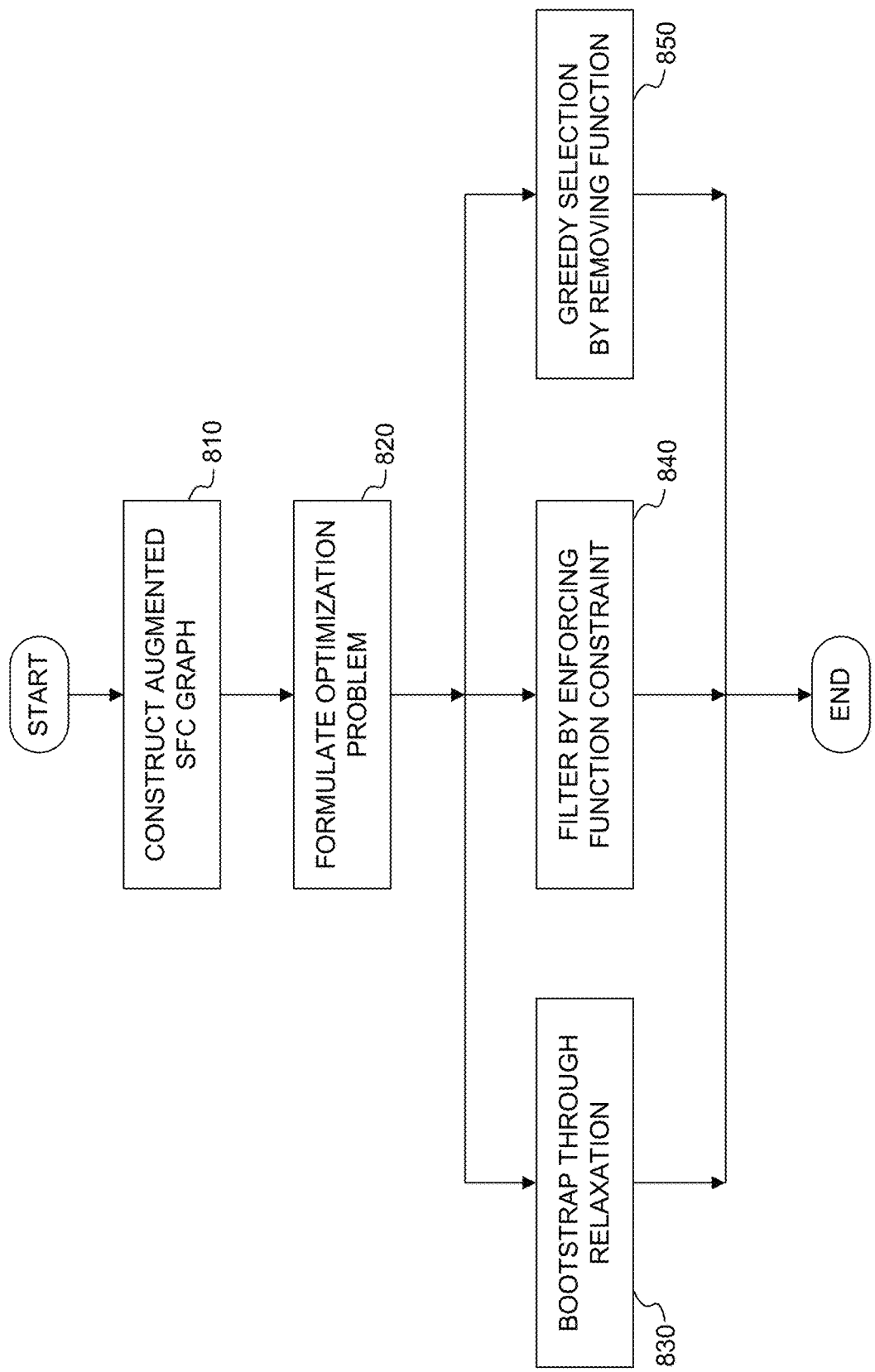
FIG. 8 is a flowchart showing example method actions that may be performed by the topology optimizer of FIG. 1 on the logical topology description to generate the virtual network topology.

In some examples, the optimizer 140 performs such tuning through a problem-solving process similar to that shown in the example flow chart of FIG. 8. FIG. 8 illustrates a method 800

One action 810 is to construct an augmented SFC (A-SFC) graph. Examples of methods and algorithms that may be used to carry out this action can be found in PCT International Patent Application Serial No. PCT/US2016/014159 to Li et al. ("Li") under the heading "VF-FG/SFC augmentation".

One action 820 is to formulate an optimization problem from the A-SFC graph, which may be solved by means of a heuristic solution. Examples of methods and algorithms that may be used to carry out this action can be found in Li under the heading "Problem Formulation"

Such a heuristic solution may involve one or more of an optimization toolkit of actions 830, 840, 850. Examples of methods and algorithms that may be used to carry out such actions can be found in Li under the heading "A PRACTICAL HEURISTIC SOLUTION".

One action 830 is to bootstrap through relaxation. Bootstrapping is the practice of estimating properties by measuring those properties when sampling from an approximating distribution of a population by resampling. A relaxation is an approximation of a difficult problem by a nearby problem that is easier to solve. In the present disclosure, this involves resampling the constructed graph by replacing one of the PoPs. This provides a mechanism for quick decision-making based on solution to relaxed problem. Examples of methods and algorithms that may be used to carry out this action can be found in Li under the heading "A. Bootstrapping through relaxation".

One action 840 is to filter by enforcing function constraints. This provides decision-making for conflicting functions. The function contraints can be function conflict restraints and/or function grouping constraints (or function collocation constraints).

Examples of such constraints can be found in Li under the heading "Problem Formulation".

The constraints may comprise system constraints 181 and/or customer-supplied constraints 141. The system constraints 181 may include without limitation, any one or more of the following:

First-level TE constraints relating to TE on the A-SFC and/or the service traffic distribution, Second-level TE constraints relating to TE on the physical network to support the first level TE decision, Function placement constraints in which an NF is placed at a PoP if the NF receives no traffic at the PoP, Node activation constraints in which a PoP is activated when there is at least one NF placed on it, Horizontal recursion constraints in which the number of instances of a NF is subject to an upper bound, Function conflict constraints in which two NFs are precluded from being co-located on a common PoP, Function grouping constraints in which two NFs should be collocated on a common PoP;

Function processing load constraints that limit an incoming traffic rate to be less than or equal to a processing rate available at a PoP, Function count constraints in which the number of NFs that are located on a common PoP is subject to an upper bound, and/or Compute resource constraints in which the compute resources available at a PoP are subject to an upper bound.

Customer-supplied constraints may include without limitation, constraints imposed on INSFs 492. That is, the INSFs 492 in the LT description 133 may fall into one of three categories, namely (a) INSFs 492 that are not customer-identified, (b) customer-identified INSFs 492 where the geographic location of the PoP to which the INSF 492 is mapped is fixed by the customer 10, and (c) customer-identified INSFs 492 where the customer 10 does not specify a geographic location and/or constraint and/or imposes a loose or variable constraint on location.

In the first category, the fact that the customer 10 did not specify the INSF 492 means that the optimizer 130 and/or optimizer 140 is free to map the INSF 492 onto any available PoP. As such, the mapper 130 and/or optimizer 140 may map the INSF 492 to maximize performance in the network slice and/or in the overall network or to satisfy system constraints 181.

In the second category, the customer 10 has imposed constraints on the location of the INSF 492 and the mapper 130 and/or optimizer 140 will map the INSF 492 on an available PoP that satisfies such constraints.

In the third category, the lack of significant or any constraint imposed by the customer 10 on the location of the customer-specified INSF 492 means that the mapper 130 and/or optimizer 140 is relatively free to map the INSF 492 onto any available PoP. As such, the mapper 130/optimizer 140 may map the INSF 492 to maximize performance in the network slice and/or in the overall network.

As will be seen below, the ability to map the INSF 492 without constraint may permit the optimizer 140 to move and/or modify the INSF 492 as part of the optimization process. For example, the optimizer 140 may decompose an INSF 492 (that falls into the first or third category) in a first composite SLG 490 by replacing it with a second composite SLG 490, in which the INSF 492 in the first composite SLG 490 is replaced by a plurality of INSFs 492 interconnected by the components of the second composite SLG 490. For example, the optimizer 140 can interpose an INSF 492 performing a PA function to transform a large number of intermittent small data flows into a smaller number of periodic larger data flows.

Examples of methods and algorithms that may be used to carry out this action can be found in Li under the heading "B. Filtering by enforcing non-collocation constraints".

One action 850 is greedy selection by removing function instances. Greedy selection attempts to find a global optimum by making a locally optimal choice at each stage. A greedy heuristic may yield a locally optimal solution that approximates a global optimal solution in a reasonable time. In the present disclosure this involves greedily displacing one or more NF instances to iteratively improve the network performance. Examples of methods and algorithms that may be used to carry out this action can be found in Li under the heading "C. Greedy selection by turning-off of eta nodes".

In some examples, one or more or a subset of one or more of the actions 830, 840 and 850 may be performed jointly and/or simultaneously. In some examples, one or more or a subset of one or more of the action 830, 840 and 850 may be omitted.

Figure 17:
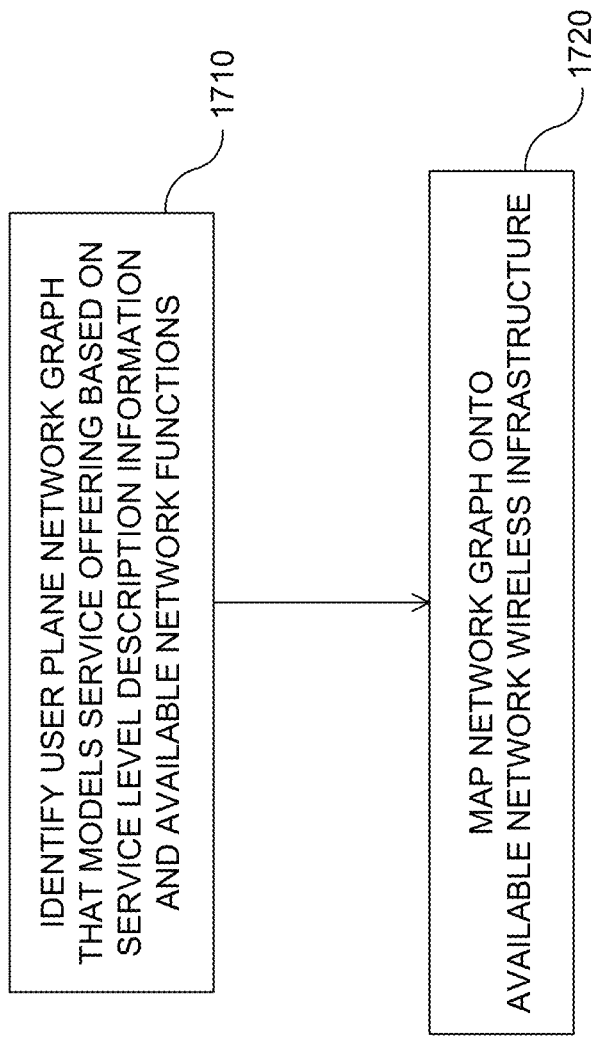
FIG. 17 is a flow chart showing method actions according to an example.

Turning now to FIG. 17, there is shown a flow chart, shown generally at 1700, showing example actions taken by a processor in the SDT controller for determining a user plane virtual network logical topology.

One example action 1710 is to identify a user plane network graph that models the service offering based on the SLD information and the available NFs 151.

One example action 1720 is to map the network graph onto the available GWNI 170.

EXAMPLE DEVICE

Having described in detail example embodiments that are in accordance with the present disclosure, it is noted that the embodiments reside primarily in combinations of apparatus or devices and processing actions related to interactions between one or more of such components.

Figure 9:
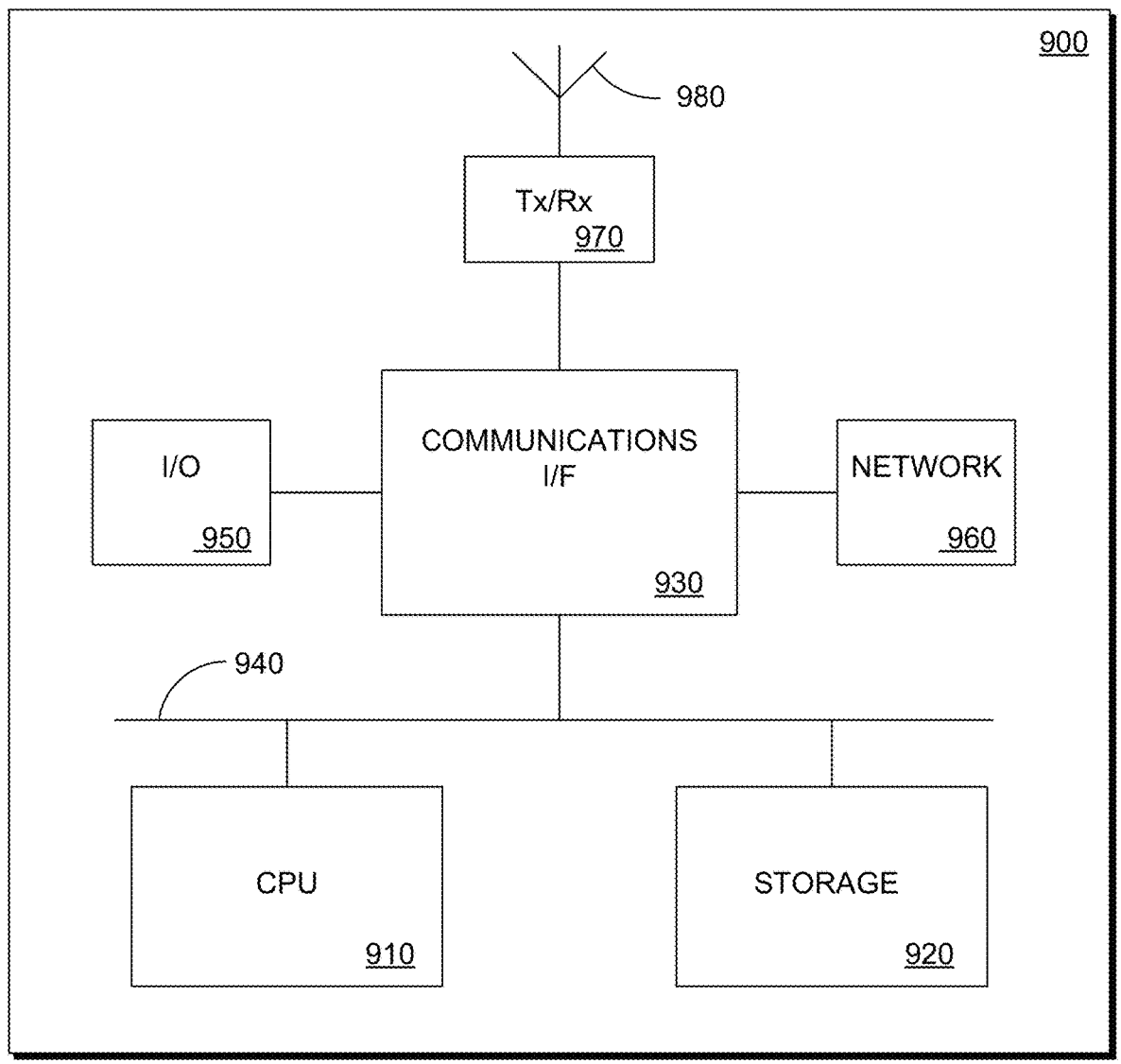
FIG. 9 is a schematic view of a processing system according to an example of the present disclosure.

FIG. 9 is a block diagram of a processing system that may be used for implementing one or more devices, shown generally at 900, such as the SDT controller 100 for performing actions in one or more of the methods disclosed herein.

The device 900 comprises a processing unit 910, a storage medium 920 and a communications interface 930. In some examples, the device 900 may also comprise a processing bus 940 interconnecting some or all of these components, as well as other devices and/or controllers. In some examples, the device 900 may comprise an input/output (I/O) device 950, a network connectivity device 960, a transceiver 970 and/or an antenna 980.

The processing unit 910 controls the general operation of the device 900, for example, by sending data and/or control signals to the communications interface 930, and by retrieving data and/or instructions from the storage medium 920 to execute method actions disclosed herein.

However configured, the hardware of the processing unit 910 is configured so as to be capable of operating with sufficient software, processing power, memory resources and network throughput capability to handle any workload placed upon it.

The storage medium 920 provides storage of data used by the device 900, as described above.

The storage medium 920 may also be configured to store computer codes and/or code sequences, instructions, configuration information, data and/or scripts in a computer program residing on or in a computer program product that, when executed by the processing unit 910, causes the processing unit 910 to perform one or more functions associated with the device 900, as disclosed herein.

The communications interface 930 facilitates communication with the I/O device(s) 950, network connectivity device(s) 960 and/or other entities in a communications network. In some examples, the communications interface 930 is for connection to a transceiver 970, which may comprise one or more transmitters and/or receivers, and at least one antenna 980, through which such communications are effected. As such, the communications interface 930 may comprise one or more interfaces and a suitable number of ports, to couple internal and external I/O devices 950, network connectivity devices 960 and the like to the processing unit 910.

Network connectivity devices 960 may enable the processing unit 910 to communicate with the internet or one or more intranets (not shown) to communicate with remote devices for data processing and/or communications. The network connectivity devices 960 may also comprise and/or interface with one or more transceivers 970 for wirelessly or otherwise transmitting and receiving signals. With such a network connection, it is contemplated that the processing unit 910 may receive information from the network or might output information to the network in the course of performing one or more of the above-described method actions.

The transceiver 970 operates to prepare data to be transmitted and/or to convert received data for processing by the processing unit 910.

Other components, as well as related functionality of the device 900, may have been omitted in order not to obscure the concepts presented herein.

EXAMPLE METHOD

Figure 10:
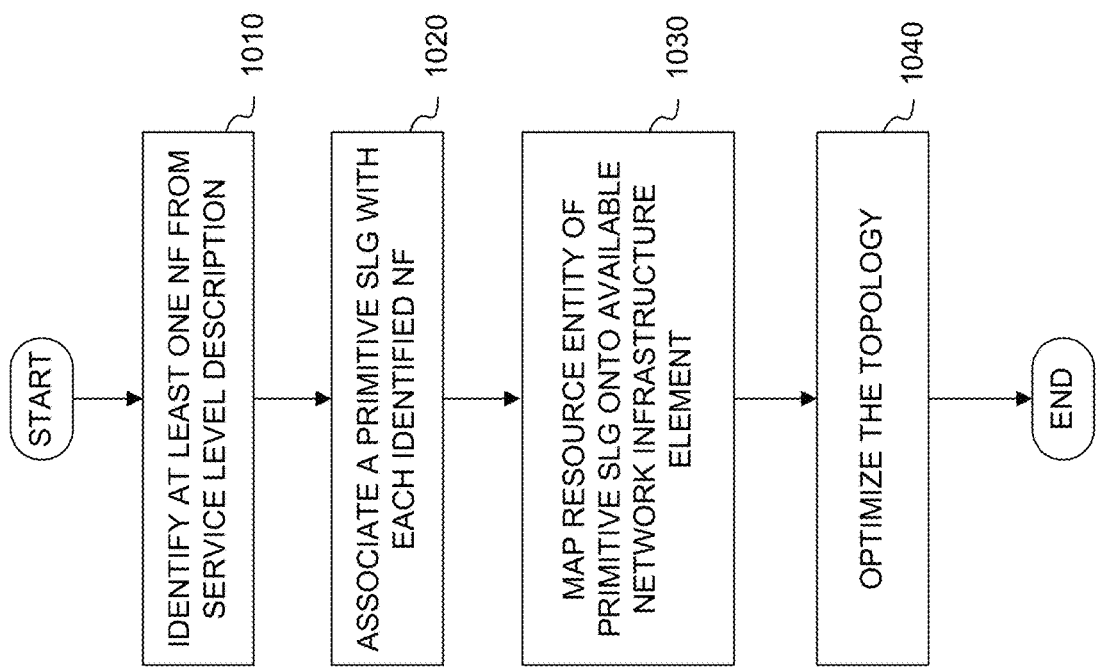
FIG. 10 is a flow chart showing example method actions that may be taken by the SDT controller according to an example of the present disclosure.

Turning now to FIG. 10, there is shown a flow chart, shown generally at 1000, showing example actions taken by a processor in the controller 100 for determining a topology for a service offering, within the network that provides the offered service.

One example action 1010 is to identify at least one NF from an SLD.

One example action 1020 is to associate a primitive SLG representing at least one data flow between directly-coupled resource entities with each identified NF.

One example action 1030 is to map a resource entity of a primitive SLG onto an available network infrastructure element.

One example action 1040 may be to optimize the topology.

Figure 11:
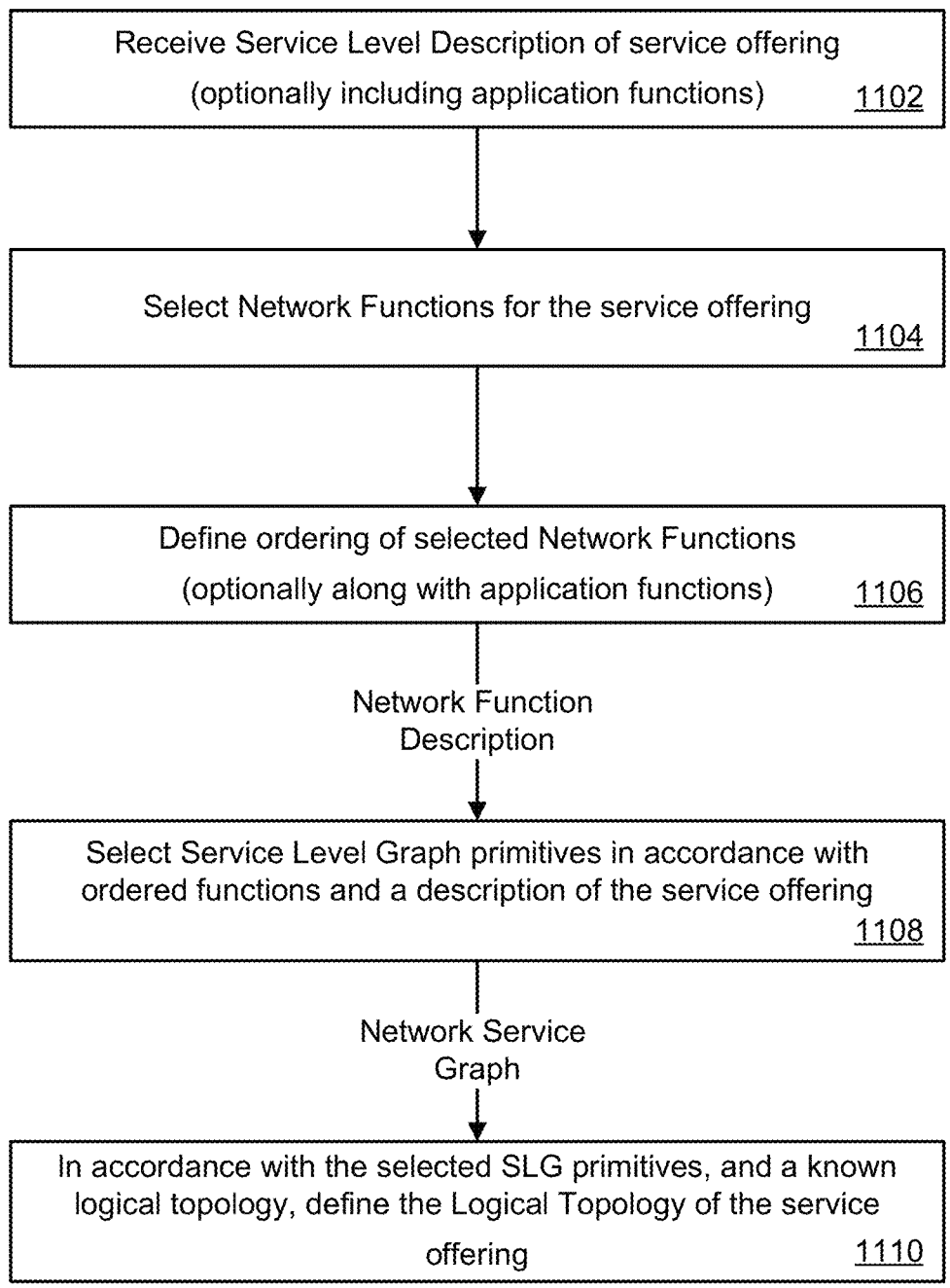
FIG. 11 is a flow chart illustrating an example of a method of defining a service level topology.

FIG. 11, is another flow chart illustrating an example of a method 1100 for use in some embodiments. A Service Level Description of a service offering is received in 1102. The SLD may also, in some embodiments, include identification of application specific functions. In 1104, the SLD is used to select a set of network functions to be used in implementing the service offering. The NFs selected in 1104 may fully replace the application functions, if specified, or they may supplement the included application functions. In 1106, an ordering of the NFs and application functions can be defined. This can be done in accordance with the SLD and other information. This ordered set of functions (possibly both Application and Network Functions) can be considered as defining network function description, such as NFD 113. In accordance with the NFD, and a library of pre-defined SLG primitives, a set of SLG primitives is selected in 1108. The selection of the SLG primitives can be done in accordance with the ordered function, and a description of the service offering as well as the library of SLG primitives. The linked SLG primitives, along with functions at the terminal nodes of each SLG, results in a network service graph, such as Network Graph Description 123. In 1110 the interlinked SLG primitives, and the ordering of the network functions that they represent can be used with the topology of the underlying network (or network slice) to generate a topology. This topology may be further optimized in some embodiments (for example using method 800 of FIG. 8).

TERMINOLOGY

The terms "including" and "comprising" are used in an open-ended fashion, and thus should be interpreted to mean "including, but not limited to". The terms "example" and "exemplary" are used simply to identify instances for illustrative purposes and should not be interpreted as limiting the scope of the invention to the stated instances. In particular, the term "exemplary" should not be interpreted to denote or confer any laudatory, beneficial or other quality to the expression with which it is used, whether in terms of design, performance or otherwise.

The terms "couple" and "communicate" in any form are intended to mean either a direct connection or indirect connection through some interface, device, intermediate component or connection, whether electrically, mechanically, chemically, or otherwise.

Directional terms such as "upward", "downward", "left" and "right" are used to refer to directions in the drawings to which reference is made unless otherwise stated. Similarly, words such as "inward" and "outward" are used to refer to directions toward and away from, respectively, the geometric center of the device, area or volume or designated parts thereof. Moreover, all dimensions described herein are intended solely to be by way of example for purposes of illustrating certain embodiments and are not intended to limit the scope of the disclosure to any embodiments that may depart from such dimensions as may be specified.

References in the singular form include the plural and vice versa, unless otherwise noted.

As used herein, relational terms, such as "first" and "second", and numbering devices such as "a", "b" and the like, may be used solely to distinguish one entity or element from another entity or element, without necessarily requiring or implying any physical or logical relationship or order between such entities or elements.

GENERAL

All statements herein reciting principles, aspects and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be appreciated that the present disclosure, which can be modified by omitting, adding or replacing elements with equivalent functional elements, provides many applicable inventive concepts that may be embodied in a wide variety of specific contexts. The specific embodiments discussed are merely illustrative of specific ways to make and use the disclosure, and do not limit the scope of the present disclosure. Rather, the general principles set forth herein are considered to be merely illustrative of the scope of the present disclosure.

It will be apparent that various modifications and variations covering alternatives, modifications and equivalents will be apparent to persons having ordinary skill in the relevant art upon reference to this description and may be made to the embodiments disclosed herein, without departing from the present disclosure, as defined by the appended claims.

Accordingly the specification and the embodiments disclosed therein are to be considered examples only, with a true scope of the disclosure being disclosed by the following numbered claims:

What is claimed is:

1. A method for determining a topology for a service offering in a network, the method comprising actions at a controller node associated with the network, of:
    receiving a service level description (SLD) of a slice from a customer of the service offering, the SLD specifying one or more application functions;
    identifying a set of network functions (NFs) in accordance with the SLD;
    according to the received SLD and the identified set of NFs and the one or more specified application functions, identifying a user plane virtual network graph that models the service offering;
    selecting service level graph (SLG) primitives in accordance with each identified NF and the specified application function, and ordering the identified set of NFs, the SLG primitives defining data flow between initial and terminating resource entities;
    determining a user plane virtual network logical topology in accordance with the user plane virtual network graph;
    in accordance with the selected SLG primitives, and a known logical topology, mapping at least one resource entity associated with an SLG primitive to a logical node within the network and mapping each of the resource entities associated with the selected SLG primitives to a Point of Presence (PoP) associated with the network; and
    configuring the user plane virtual network logical topology, wherein configuring the user plane virtual network logical topology includes configuring, by the controller node, logical links to the identified set of NFs, wherein the controller node configures the logical links by communicating with customer servers, customer devices and a general wireless network infrastructure.

2. The method according to claim 1, wherein the action of selecting SLG primitives is performed in accordance with the SLD.

3. The method according to claim 1, wherein the resource entities are selected from a list comprising: an end-user device, a customer entity and an in-network service function (INSF) coupled to a plurality of primitive SLGs.

4. The method according to claim 1, wherein the action of selecting the SLG primitives further includes an action of linking the selected SLG primitives in accordance with the ordering of the network functions.

5. The method according to claim 1, wherein the action of mapping each of the resource entities to a PoP is performed in accordance with a known logical topology of the network.

6. The method according to claim 1, wherein the action of mapping each of the resource entities includes defining a logical topology of the service offering.

7. The method according to claim 6, further comprising an action of optimizing the topology.

8. The method according to claim 7, wherein the action of optimizing the topology comprises an action of providing performance improvements to at least one of the service offering and the network.

9. The method according to claim 8, wherein the performance improvements are selected from a list comprising: reducing a number of activated nodes, increasing total traffic, increasing a minimum service traffic rate, reducing cost and increasing revenue.

10. The method according to claim 7, wherein the action of optimizing comprises at least one of actions of:
    constructing an augmented SFC graph;
    formulating an optimization problem;
    bootstrapping through relaxation;
    filtering by enforcing function constraints; and
    removing function instances by greedy selection.

11. The method according to claim 10, wherein the function constraint is a function conflict constraint and/or a function grouping constraint.

12. The method according to claim 1, wherein the SLD includes at least one of service level graphs, service level attributes and Quality of Service (QoS).

13. The method according to claim 1, wherein a description of the application function includes slice customer-defined functions.

14. The method according to claim 1, wherein the basic network graph is associated with at least one of a packet aggregator, an anchor point, a virtual router, a point-to-multi-point switch, a convergence point, a key material holder, a protocol translator, a load balancer, a deep packet inspector and a firewall.

15. The method according to claim 1, wherein a type of the basic network graph includes at least one of a type of one-in and one-out, one-in and multiple-out, multiple-in and one-out and multiple-in and multiple-out.

16. The method according to claim 1, further comprising: determining an operation service virtual network graph; and determining operation service virtual network logical topology in accordance with the operation service virtual network graph, the user plane virtual network logical topology and general infrastructure network topology.

17. The method according to claim 1, wherein the configuring the user plane virtual network logical topology further includes instantiating, by the controller node, the identified set of NFs via communicating with the general wireless network infrastructure.

18. The method according to claim 17, wherein the configuring the user plane virtual network logical topology further includes configuring, by the controller node, the instantiated identified set of NFs via communicating with the general wireless network infrastructure.

19. A Software Defined Topology (SDT) controller, for defining a topology of a service offering in a network, comprising:
    a network interface for receiving from and transmitting to nodes connected to the network;
    a processor; and
    a memory for storing instructions that when executed by the processor cause the SDT controller to:
        receive a service level description (SLD) of a slice from a customer of the service offering, the SLD specifying one or more application functions;

identify a set of network functions (NFs) in accordance with the SLD;

according to the received SLD and the identified set of NFs and the one or more specified application functions, identify a user plane virtual network graph that models the service offering;

select service level graph (SLG) primitives in accordance with each identified NF and the specified application function, and order the identified set of NFs, the SLG primitives defining data flow between initial and terminating resource entities;

determine a user plane virtual network logical topology in accordance with the user plane virtual network graph;

in accordance with the selected SLG primitives and a known logical topology, map at least one resource entity associated with an SLG primitive to a logical node within the network and map each of the resource entities associated with the selected SLG primitives to a Point of Presence (PoP) associated with the network; and configure the user plane virtual network logical topology, wherein configuration of the user plane virtual network logical topology includes configuring by the SDT controller, logical links to the identified set of NFs, wherein the SDT controller configures the logical links by communicating with customer servers, customer devices and a general wireless network infrastructure.

20. The SDT controller of claim 19, wherein the SLD is received over the network interface from a customer.

21. The SDT controller of claim 19, wherein instructions further comprising instructions that when executed by the processor cause the SDT controller to determine an operation service virtual network graph and determine operation service virtual network logical topology in accordance with the operation service virtual network graph, the user plane virtual network logical topology and general infrastructure network topology.

22. The SDT controller of claim 19, wherein the configuring the user plane virtual network logical topology further includes instantiating, by the SDT controller, the identified set of NFs via communicating with the general wireless network infrastructure.

23. The SDT controller of claim 22, wherein the configuring the user plane virtual network logical topology further includes configuring, by the SDT controller, the instantiated identified set of NFs via communicating with the general wireless network infrastructure.

24. A method for determining a topology for service offering in a network, the method comprising:

receiving a service level description, SLD, from a customer, wherein the received SLD specifies one or more application functions;

identifying a set of network functions, NFs, in accordance with the SLD associated with the service offering from a set of virtual network functions, wherein the set of virtual network functions comprises operator added network functions and one or more virtual service functions provided as part of customer supplied service function chains;

selecting service level graph, SLG, primitives in accordance with each identified NF, and an ordering associated with the identified set of NFs, the selected SLG primitives defining data flow between initial and terminating resource entities; and in accordance with the selected SLG primitives, and a known logical topology, mapping at least one resource entity associated with an SLG primitive to a logical node within the network;

wherein selecting the SLG primitives is performed in accordance with the specified application function;

wherein selecting the SLG primitives further includes linking the selected SLG primitives in accordance with the ordering associated with the identified set of NFs.

* * * * *